United States Patent
Rodrigues et al.

(10) Patent No.: US 11,845,095 B2
(45) Date of Patent: Dec. 19, 2023

(54) COATING MACHINE

(71) Applicant: ABB Schweiz AG, Baden (CH)

(72) Inventors: Jose Rodrigues, Carcavelos (PT);
Takahiro Tawata, Fujieda (JP);
Kuniharu Yamauchi, Nagakute (JP)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/420,013

(22) PCT Filed: Aug. 9, 2019

(86) PCT No.: PCT/JP2019/031695
§ 371 (c)(1),
(2) Date: Feb. 3, 2022

(87) PCT Pub. No.: WO2021/028983
PCT Pub. Date: Feb. 18, 2021

(65) Prior Publication Data
US 2022/0168769 A1   Jun. 2, 2022

(51) Int. Cl.
*B05B 13/04* (2006.01)
*B05B 12/12* (2006.01)
(Continued)

(52) U.S. Cl.
CPC ............ *B05B 13/0431* (2013.01); *B05B 1/16* (2013.01); *B05B 12/149* (2013.01);
(Continued)

(58) Field of Classification Search
USPC .......................................... 118/321, 323, 302
See application file for complete search history.

(56) References Cited

U.S. PATENT DOCUMENTS 6,458,424 B1 * 10/2002 Yoshida .............. B05B 12/1463
427/427.2
2002/0155069 A1 10/2002 Pruche et al.
(Continued)

FOREIGN PATENT DOCUMENTS

JP        7-171451 A    7/1995
JP        7-227556 A    8/1995
(Continued)

OTHER PUBLICATIONS

Japan Patent Office, Notice of Reasons for Refusal in Japanese Patent Application No. 2021-539717, 10 pp. (dated May 31, 2022).
(Continued)

*Primary Examiner* — Yewebdar T Tadesse
(74) *Attorney, Agent, or Firm* — Leydig, Voit & Mayer, Ltd.

(57) ABSTRACT

An inkjet coating machine is provided to prevent the components in the paint from precipitating. The inkjet coating machine includes: a robot arm having a chuck at a front end and a nozzle head unit detachably mounted on the chuck. The nozzle head unit includes a nozzle head having a nozzle for spraying the paint, a nozzle control unit for controlling driving of the nozzle, and a head-side circulation path enabling the paint to circulate within the nozzle head. The nozzle head, the nozzle control unit and the head-side circulation path are integrally configured. The coating machine further includes a standby holding unit that holds at least one nozzle head unit in standby and a head replacement unit that replaces the nozzle head unit.

11 Claims, 15 Drawing Sheets

(51) Int. Cl.
  *B05C 11/10* (2006.01)
  *B05B 1/16* (2006.01)
  *B05B 12/14* (2006.01)
  *B05C 5/00* (2006.01)

(52) U.S. Cl.
  CPC ............ *B05B 12/1454* (2013.01); *B05C 5/00* (2013.01); *B05C 11/1036* (2013.01)

(56) References Cited

U.S. PATENT DOCUMENTS

| | | | |
|---|---|---|---|
| 2008/0158304 A1 | 7/2008 | Eto | |
| 2010/0196616 A1* | 8/2010 | Clifford | B05B 5/1675 901/29 |
| 2014/0118448 A1 | 5/2014 | Domae | |
| 2017/0128962 A1* | 5/2017 | Kashiyama | B05B 3/02 |

FOREIGN PATENT DOCUMENTS

| | | |
|---|---|---|
| JP | 2006-159811 A | 6/2006 |
| JP | 2010-100011 A | 5/2010 |
| JP | 2011-16283 A | 1/2011 |
| JP | 2011-136469 A | 7/2011 |
| JP | 2014-58141 A | 4/2014 |
| JP | WO2012/060153 A1 | 5/2014 |
| JP | 2015-211937 A | 11/2015 |
| JP | 2016-107418 A | 6/2016 |
| JP | 2016-172379 A | 9/2016 |
| JP | 2017-119391 A | 7/2017 |
| JP | 2019-42696 A | 3/2019 |
| WO | WO 2017/141483 A1 | 8/2017 |

OTHER PUBLICATIONS

The State Intellectual Property Office of People's Republic of China, Office Action in Chinese Patent Application No. 201980087350. 7, 22 pp. (dated Apr. 24, 2022).

The State Intellectual Property Office of People's Republic of China, Office Action in Chinese Patent Application No. 201980087350. 7, 21 pp. (dated Aug. 3, 2022).

Japan Patent Office, International Search Report in International Patent Application No. PCT/JP2019/031695, 3 pp. (dated Sep. 10, 2019).

European Patent Office, Extended European Search Report in European Patent Application No. 19941763.5, 7 pp. (dated Apr. 5, 2023).

\* cited by examiner

COATING MACHINE

CROSS-REFERENCE TO RELATED APPLICATIONS

This patent application is a U.S. national phase patent application of International Patent Application No. PCT/JP2019/031695, filed Aug. 9, 2019, which is fully incorporated herein by reference for all purposes.

FIELD

The present invention relates to a coating machine.

BACKGROUND

Robot coating, for example using the robot as shown in patent literature 1, has dominated the coating line for vehicles such as automobiles. In the above robot coating, a coating machine (rotary atomizing type) having a rotary atomizing coating head mounted at a front end of an articulated robot is used.

In replacement of the rotary atomizing coating machine, an inkjet coating machine as disclosed in patent literature 2 is proposed for vehicle coating. According to the patent literature 1, ink (paint) is sprayed from respective nozzles of the nozzle column to coat the vehicle.

D1: the publication of Japanese Patent No. 3648134
D2: the publication of Japanese Patent No. 5976320

However, for the rotary atomizing coating machine as disclosed in the patent literature 1, the following problem exists: the sprayed paint mist may adhere to objects other than the vehicle to be coated (for example, the coating machine itself), which contaminates the coating machine itself and lowers the coating efficiency. Besides the paint loss, problems such as an incensement in the size of the device for recycling the paint not adhered to the vehicle and additional costs for managing and operating the device may exist.

Further, for the inkjet coating machine as disclosed in the patent literature 2, the following problem exists: precipitation may happen in the components of the paint depending on the type of paint. The precipitation causes clogging of the nozzle and leads to coating failure. Moreover, for the inkjet coating machine as disclosed in the patent literature 2, the following problem exists: since the internal structure within the nozzle head is complicated, the time spent on cleaning will increase in case of change the type of paint used, e.g., color change.

SUMMARY

The present invention is made in view of the above situations and is intended to provide an inkjet coating machine which can inhibit precipitation from happening in the components of the paint and reduce the time required for changing the type of paint.

To address the above problems, according to a first aspect of the present invention, there is provided an inkjet coating machine, characterized in that an inkjet coating machine which performs coating by spraying paint from a nozzle, comprising: a robot arm having a chuck at a front end; a nozzle head unit detachably mounted on the chuck and including: a nozzle head having a nozzle for spraying the paint, a nozzle control unit for controlling driving of the nozzle, and a head-side circulation path enabling the paint to circulate within the nozzle head, wherein the nozzle head, the nozzle control unit and the head-side circulation path are integrally configured and detachably mounted with respect to the chuck; a standby holding unit that holds at least one nozzle head unit in a standby state; and a head replacement unit that replaces the nozzle head unit mounted on the chuck with the nozzle head unit held by the standby holding unit.

Besides, in the above invention, the nozzle head unit is preferably provided with a paint storage unit storing the paint sprayed from the nozzle, and the paint storage unit is connected, in a state in which the paint is able to be supplied, to the head-side circulation path.

Besides, in the above invention, the paint storage unit preferably is a paint supply tank integrated with the nozzle head unit, and the head-side circulation path enables the paint to circulate between the head-side circulation path and the paint supply tank.

Besides, in the above invention, the paint supply tank preferably causes the paint from the nozzle head to return to the paint supply tank by connecting the paint supply tank to the head-side circulation path at one end; a cylinder storing the paint and a piston sliding within the cylinder are provided within the paint supply tank; an extruding apparatus is provided for pressing the piston in the cylinder; a supply volume control unit for controlling actuations of the extruding apparatus is provided; the supply volume control unit controls actuations of the extruding apparatus that extrudes the piston based on supply volume of the paint fed to the nozzle head and return volume of the paint returning from the nozzle head.

Besides, in the above invention, it is preferable that the paint storage unit is a cartridge storing the paint, and the nozzle head is provided with a cartridge mounting unit on which the cartridge is detachably mounted.

In the above invention, preferably, a paint storage unit that stores the paint sprayed from the nozzle is provided at the robot arm, and an arm-side circulation path enabling flow of the paint is provided at the robot arm; the arm-side circulation path is provided with: an arm-side supply path that feeds the paint supplied from the paint storage unit towards the head-side circulation path; and an arm-side return path that causes the paint not sprayed from the nozzle to return from the head-side circulation path and supplies the paint to the arm-side supply path again.

In the above invention, it is preferred that the paint storage unit is a cartridge that stores the paint, and the robot arm is provided with a cartridge mounting unit on which the cartridge is detachably mounted.

In the above invention, it is preferable that a cartridge standby holding unit for holding the cartridge in standby is provided; and a cartridge replacement unit is configured to replace the cartridge mounted on the cartridge mounting unit with the cartridge held by the cartridge standby holding unit.

In the above invention, preferably, the robot arm is provided with a color changing valve, the color changing valve having a paint storage unit that stores paint of each color and enabling color changing so that a chosen paint can be supplied to the nozzle head; and the robot arm is provided with an arm-side circulation path that enables flow of the paint; the arm-side circulation path is provided with an arm-side supply path and an arm-side return path, the arm-side supply path supplying the paint from the color changing valve towards the head-side circulation path, and the arm-side return path causing the paint not sprayed from the nozzle to return from the head-side circulation path and supplying the paint towards the arm-side supply path again; the robot arm or the nozzle head unit is provided with a pressure adjustment unit and a main body control unit, the pressure adjustment unit regulating pressures of the paint flowing from the color changing valve via the arm-side supply path to the head-side circulation path, and the main body control unit controlling actuations of the color changing valve and the pressure adjustment unit; based on actuation controlling of the color changing valve and the pressure adjustment unit by the main body control unit, the paint circulates between the head-side circulation path and the color changing valve via the arm-side supply path and the arm-side return path.

Besides, in the above invention, it is preferred that the color changing valve is provided with an arm-side cleaning unit, which cleans the paint within the head-side circulation path, the arm-side supply path and the arm-side return path, and is actuation controlled by the main body control unit; when a different type of the paint from currently chosen types of the paints is newly reselected by the main body control unit using the color changing valve, the arm-side cleaning unit is caused to actuate based on controlling by the main body.

In accordance with the present invention, there is provided an inkjet coating machine which can prevent the components in the paint from precipitating.

DETAILED DESCRIPTION OF EMBODIMENTS

An inkjet coating machine and a coating method in accordance with various implementations of the present invention are to be explained below with reference to the drawings. Besides, the inkjet coating machine and the coating method in accordance with the implementation "coat" a coating object, such as vehicle or vehicle parts, to form a coating film over the surface of the coating object for protection and aesthetic purpose. Further, in addition to forming the above coating film, the inkjet coating machine and the coating method in accordance with the implementation also can form a variety of appearance designs and images for the coating object, like vehicle and vehicle parts.

First Implementation (1-1 Regarding Overall Structure of Inkjet Coating Machine)

Figure 1:
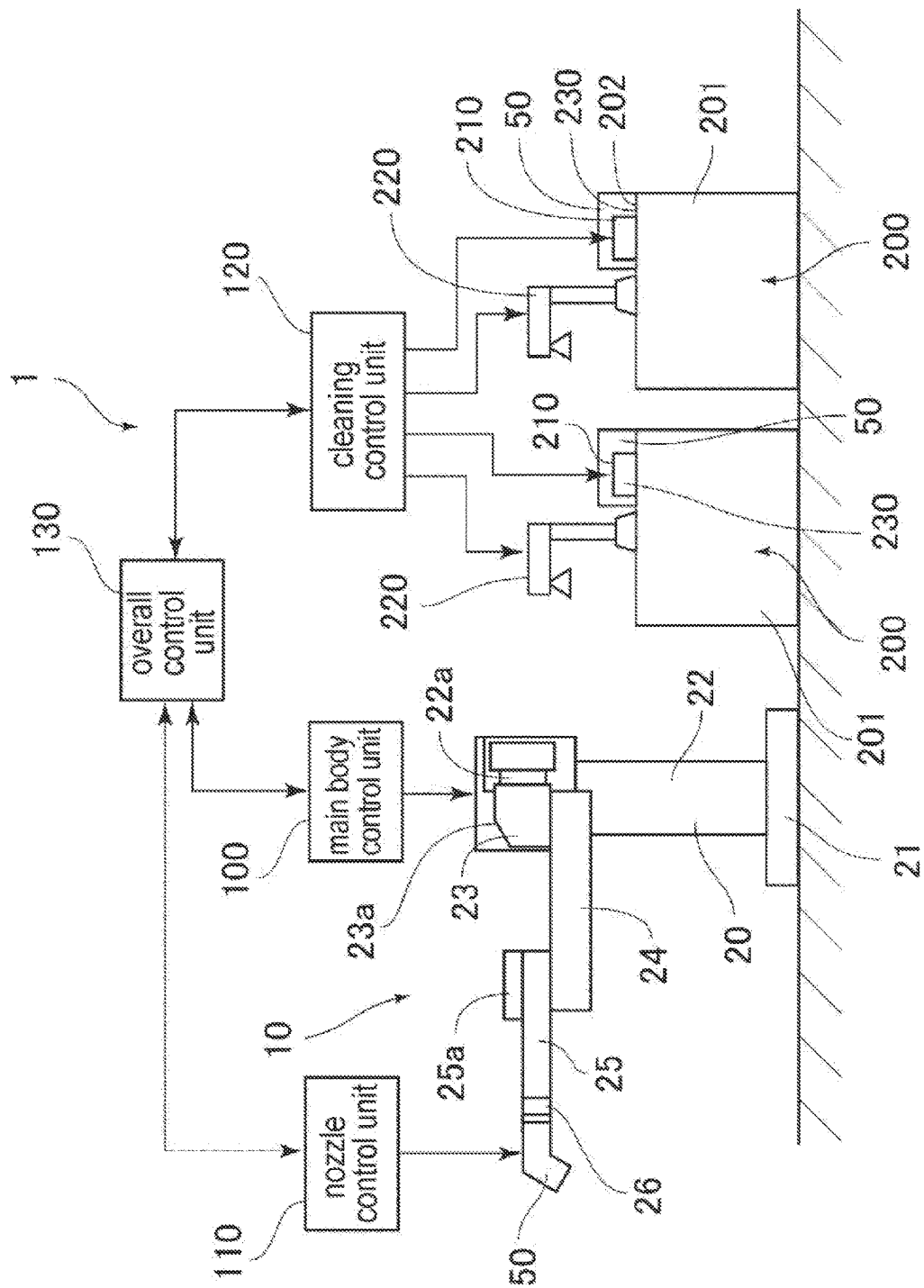
FIG. 1 illustrates a schematic diagram of the overall structure of the inkjet coating machine 10 in accordance with the first implementation of the present invention.

First of all, the overall structure of the inkjet coating machine in accordance with the first implementation of the present invention is described. FIG. 1 illustrates a schematic diagram of the overall structure of the inkjet coating machine 10 in accordance with the first implementation of the present invention. As shown, the inkjet coating machine 10 includes a coating apparatus main body 20 and a nozzle head unit 50. Besides, a coating system 1 is mainly comprised of the inkjet coating machine 10, a work station 200 and an overall control unit 120. However, the coating system 1 may act as the inkjet coating machine from a broad sense. In such case, the inkjet coating machine 10 includes the work station 200 and the overall control unit 120. The structure of the coating system 1 after the removal of the work station 200 and the overall control unit 120 may serve as the inkjet coating machine 10 in a narrow sense.

(1-2 Regarding Coating Apparatus Main Body)

The coating apparatus main body 20 includes a base table 21, a leg 22, a pivot arm 23, a first rotating arm 24, a second rotating arm 25, a wrist 26, a chuck 30 and a nozzle head unit 50, wherein the base table 21 is configured on a setting position like floor surface, and also may travel relative to the setting position. In addition, the leg 22 is a part oriented upwards from the base table 21. Moreover, a joint may be provided between the leg 22 and the base table 21, such that the leg 22 can rotate relative to the base table 21.

A pivot shaft 22a is provided at an upper end of the leg 22, and the pivot arm 23 is mounted at the pivot shaft 22a in such a way that the pivot arm can pivot freely. The pivot arm 23 may be driven by a motor to rotate, the motor for example being an electric motor or pneumatic motor. When the inkjet coating machine 10 is positioned in an explosion-proof area and an electric motor is used, the preferable anti-explosion measure is to increase the internal pressure of the housing 22a1 of the pivot shaft 22a. However, in the case where the inkjet coating machine 10 is located outside the explosion-proof area, the above anti-explosion measures may not be adopted.

Besides, one end of the first rotating arm 24 is such mounted at the pivot shaft 22a that the first rotating arm can swing freely. A motor causing the first rotating arm 24 to swing is received in the housing 23a of the pivot arm 23.

Figure 2:
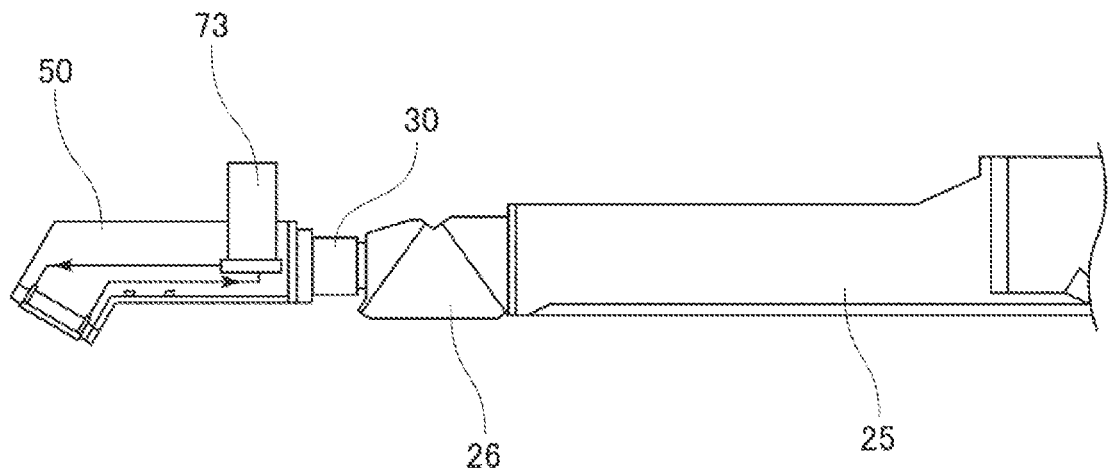
FIG. 2 illustrates a lateral view of a structure of the inkjet coating machine shown in FIG. 1 starting from the second rotating arm to the nozzle head unit.

FIG. 2 illustrates a lateral view of a structure of the inkjet coating machine 10 of the implementation starting from the second rotating arm 25 to the nozzle head unit 50. According to FIGS. 1 and 2, one end of the second rotating arm 25 is mounted at a further end of the first rotating arm 24 such that the second rotating arm can swing freely. A housing 25a is provided at one end of the second rotating arm 25 and a motor causing the second rotating arm 25 to swing is received in the housing 25a.

The wrist 26, mounted at a further end of the second rotating arm 25, can rotate around a plurality of (e.g., three) pivot shafts oriented in different directions. In such way, the orientation of the nozzle head unit 50 can be controlled with high accuracy. In addition, any number of pivot shafts may be provided as long as it is two or more.

The pivot shaft 22a, pivot arm 23, first rotating arm 24, second rotating arm 25 and wrist 26 overall correspond to the robot arm. However, the robot arm may not include at least one of the above pivot shaft 22a, pivot arm 23, first rotating arm 24, second rotating arm 25 and wrist 26, or may additionally include other structures besides the above listed ones.

With respect to the inkjet coating machine 10 in accordance with this implementation, a paint supply tank 73 is integrally fixed at the nozzle head unit 50. Accordingly, the paint supply tank 73 connects a supply path 71 with a return path 72, both of which are to be described in the following text. In addition, the paint supply tank 73 corresponds to a paint storage unit.

In the case where only one type of paint supply tank 73 is fixed to the nozzle head unit 50, a plurality of paint supply tanks 73 of the same type may also be fixed. Besides, the nozzle head unit 50 also may be fixed with not only one type of paint supply tank 72, but also various types of paint supply tanks 73. For example, a tank storing a liquid for maintenance may be fixed to the nozzle head unit 50 together with a paint supply tank 73 storing the paint of a particular color. The liquid for maintenance, for example, may be a liquid that reduces the viscosity of the paint by mixing with the pain when the paint is not sprayed for a long time, or a cleaning liquid that prevents foreign matters from accumulating inside the head-side circulation path 70 and etc. Details of the vicinity of the head-side circulation path 70 will be depicted below.

(1-3 Regarding Chuck)

Figure 3:
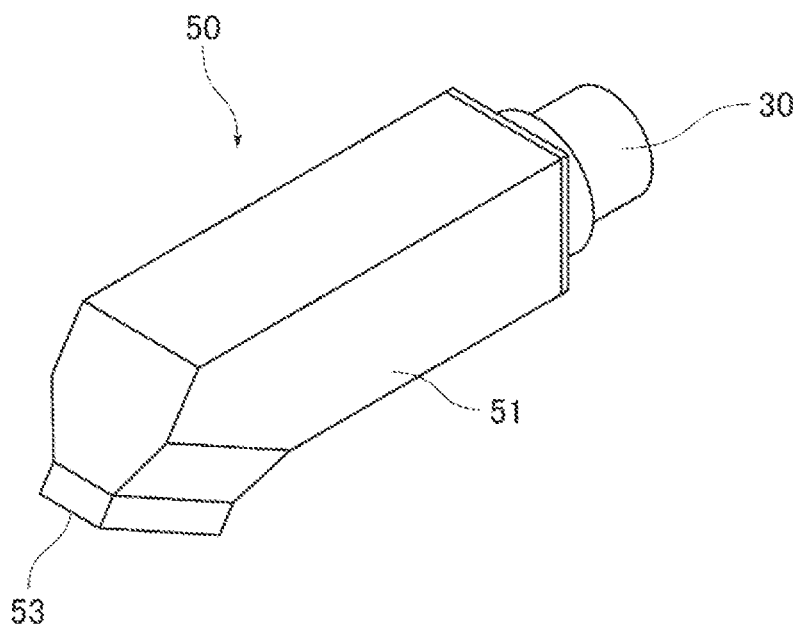
FIG. 3 is a stereogram illustrating the structure of the nozzle head unit and the chuck of the inkjet coating machine shown in FIG. 1.
Figure 4:
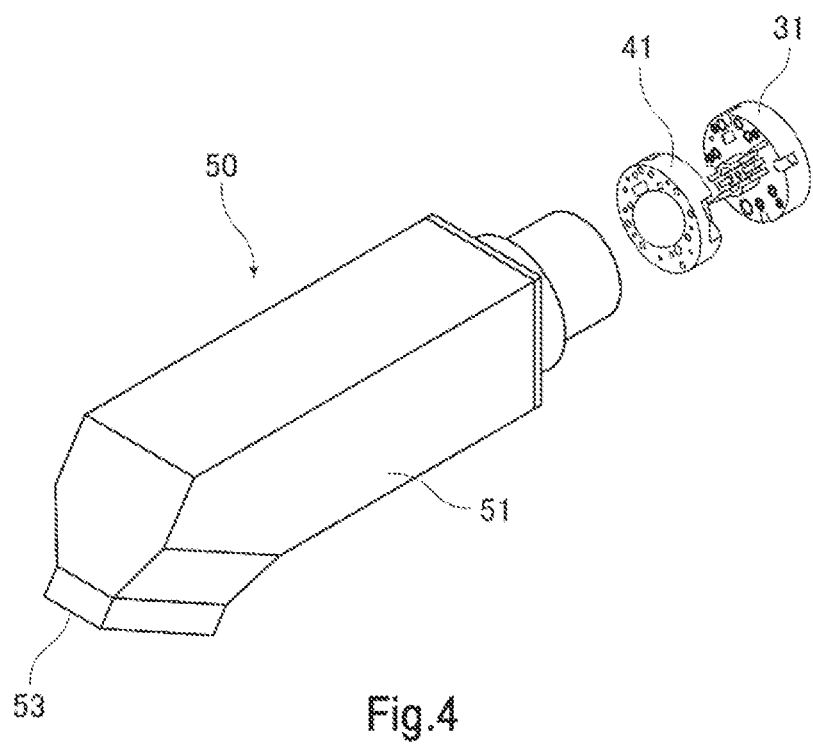
FIG. 4 is a decomposed stereogram of the nozzle head unit and the chuck of the inkjet coating machine shown in FIG. 1.

FIG. 3 is a stereogram illustrating the structure of the nozzle head unit 50 and the chuck 30. FIG. 4 is a decomposed stereogram of the nozzle head unit 50 and the chuck 30. The chuck 30 is configured between the above wrist 26 and the nozzle head unit 50. The chuck 30 includes an arm-side snapfit 31 and a head-side snapfit 41, where the arm-side snapfit 31 is fixed at the wrist 26 and the head-side snapfit 41 is fixed at the nozzle head unit 50. Further, the nozzle head unit 50 is mounted at the wrist 26 via the snap-fit between the arm-side snapfit 31 and the head-side snapfit 41.

Figure 5:
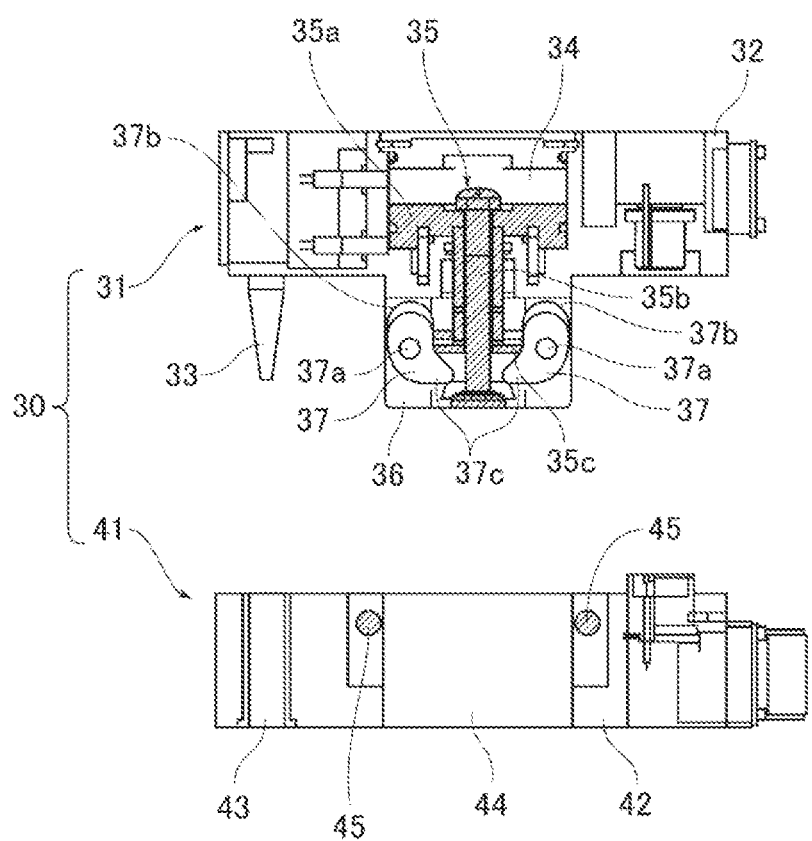
FIG. 5 is a lateral sectional view illustrating the details of the structure of the arm-side snapfit and the head-side snapfit and the state before the arm-side snapfit and the head-side snapfit are snap-fitted in the inkjet coating machine shown in FIG. 1.
Figure 6:
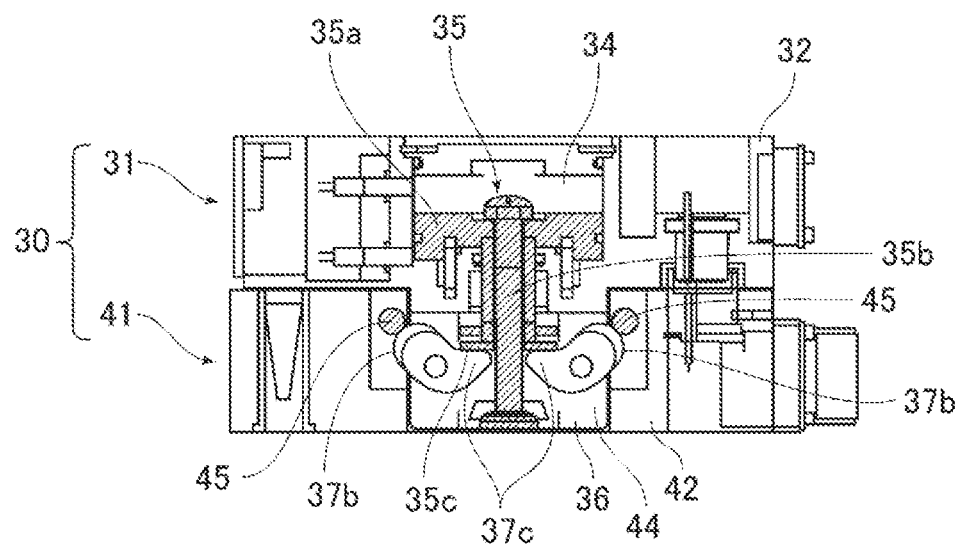
FIG. 6 is a lateral sectional view illustrating the state in which the arm-side snapfit and the head-side snapfit are snap-fitted from the state shown by FIG. 5.

FIG. 5 is a lateral sectional view illustrating the details of the structure of the arm-side snapfit 31 and the head-side snapfit 41 and the state before the arm-side snapfit 31 and the head-side snapfit 41 are snap-fitted. Besides, FIG. 6 is a lateral sectional view illustrating the details of the structure of the arm-side snapfit 31 and the head-side snapfit 41 and the state of the arm-side snapfit 31 and the head-side snapfit 41 are snap-fitted.

According to FIGS. 5 and 6, a locating pin 33 protrudes from a snapfit body 32 of the arm-side snapfit 31 (hereinafter referred to as "underside"). Besides, a locating hole 43 into which the locating pin 33 is inserted is provided at a snapfit body 32 of the head-side snapfit 41. Accordingly, the arm-side snapfit 31 and the head-side snapfit 41 are located by inserting the locating pin 33 into the locating hole 43. Further, it is preferred to provide a combination including more than two sets of the locating pin 33 and the locating hole 43.

A hole-shaped piston insertion member 34 is provided at the snapfit body 32, and a cam piston body 35 is inserted into the piston insertion member 34. The cam piston body 35 includes a piston member 35a sliding on the surface of an inner wall of the piston insertion member 34, wherein the piston member 35a is provided with a working pin 35b extending in an axial direction. A cam pressing part 35c protrudes radially from an underside of the working pin 35b of the piston member 35a and presses against a locking cam 37, which is to be described below. In addition, the cam piston body 35 is driven by a driving source (motor or cylinder) not shown.

Besides, a support protrusion 36 protrudes from the underside of the snapfit body 32, and consists of, for example, a pair of platelike elements being opposed to each other. The locking cam 37 is such mounted on the support protrusion 36 via a shaft 27a that the support protrusion can rotate freely.

A pair of locking cams 37 is provided across the working pin 35b. An interference part 37b is provided at the piston member side of the locking cam 37. The interference part 37b collides with a snap-fit pin 45 to be described later. Through the collision, the arm-side snapfit 31 is snap-fitted at the head-side snapfit 41. In addition, the locking cam 37 is further provided with an inner diameter protrusion 37c protruding towards an inner diameter side (the side of the working pin 35b) at the head-side snapfit 41 of the locking cam 37. A spring, which is not shown, applies a force on the locking cam 37, causing the interference part 37b to move towards the inner side (the side of the working pin 35b).

In a structure including the cam piston body 35, the support protrusion 36 and the locking cam 37, if the cam piston body 35 moves to the underside, the cam pressing part 35c presses against the inner diameter protrusion 37c, such that the working pin 35b is received at the inner diameter side as shown by FIG. 5. For another, if the cam piston body 35 moves towards a side away from the head-side snapfit 41 (hereinafter referred to as "upside"), the cam pressing part 35c is released from the state in which the cam pressing part presses against the inner diameter protrusion 37c. As such, the locking cam 37, under the force of the spring not shown, causes the interference part 37b to rotate towards an outer diameter side.

The head-side snapfit 41 is also provided with a cam hole 44 into which the support protrusion 36 is inserted, in addition to the above mentioned snapfit body 42 and the locating hole 43. A snapfit pin 45 is also provided at a position facing the cam hole 44. The snapfit pin 45 abuts (interferes with) the interference part 37b when the interference part 37b of the locking cam 37 rotates towards the outer diameter side. Accordingly, if the cam piston body 35 moves to the upside, the interference part 37b interferes with the snapfit pin 45 into a snap-fitted state. In contrast, if the cam piston body 35 moves to the underside, the interference part 37b moves towards the inner diameter side (the side of the working pin 35b). In such case, a chuck release state is achieved, i.e., the interference between the interference part 37b and the snapfit pin 45 is released.

(1-4 Regarding the Nozzle Head Unit)

The nozzle head unit 50 is explained below. The nozzle head unit 50 is mounted at the wrist 26 via the chuck 30. According to FIGS. 2-4, the nozzle head unit 50 includes a hood 51 provided therein with a variety of structures. Examples of the structure provided inside the hood 51 may include head-side circulation path 70 and nozzle control unit 110 to be described later.

Figure 7:
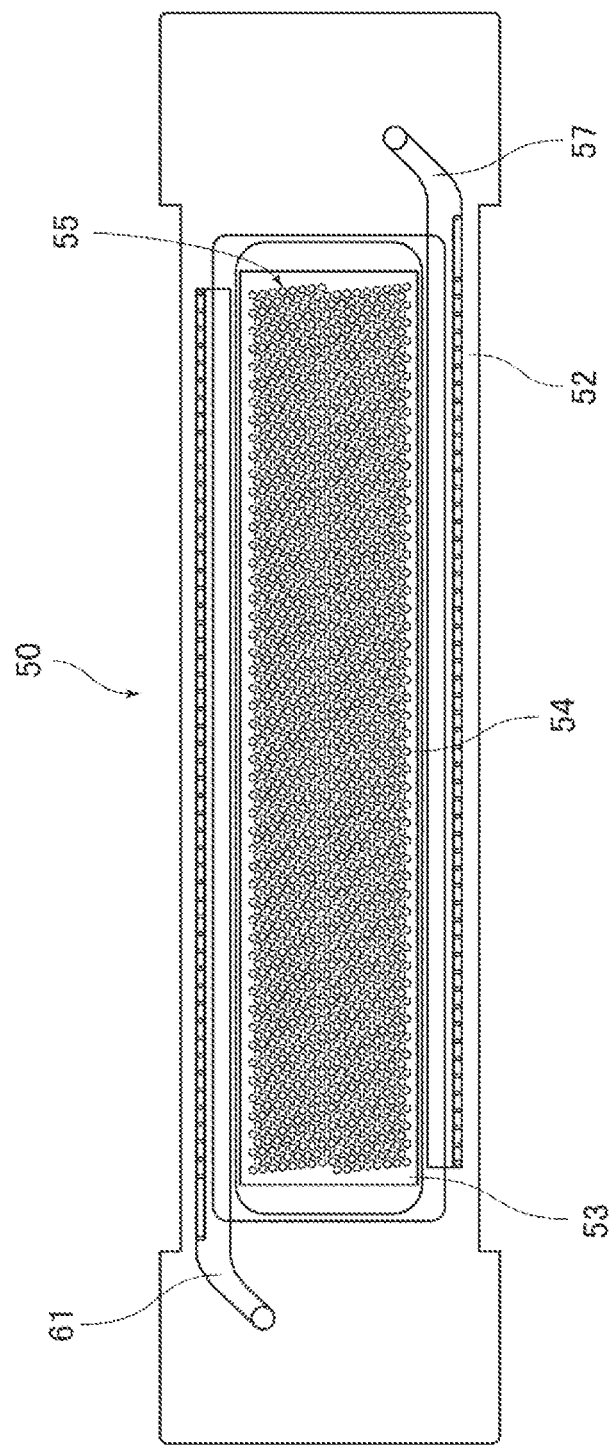
FIG. 7 is a front view of a nozzle spraying face that sprays the paint in the nozzle head unit in the inkjet coating machine shown in FIG. 1.
Figure 8:
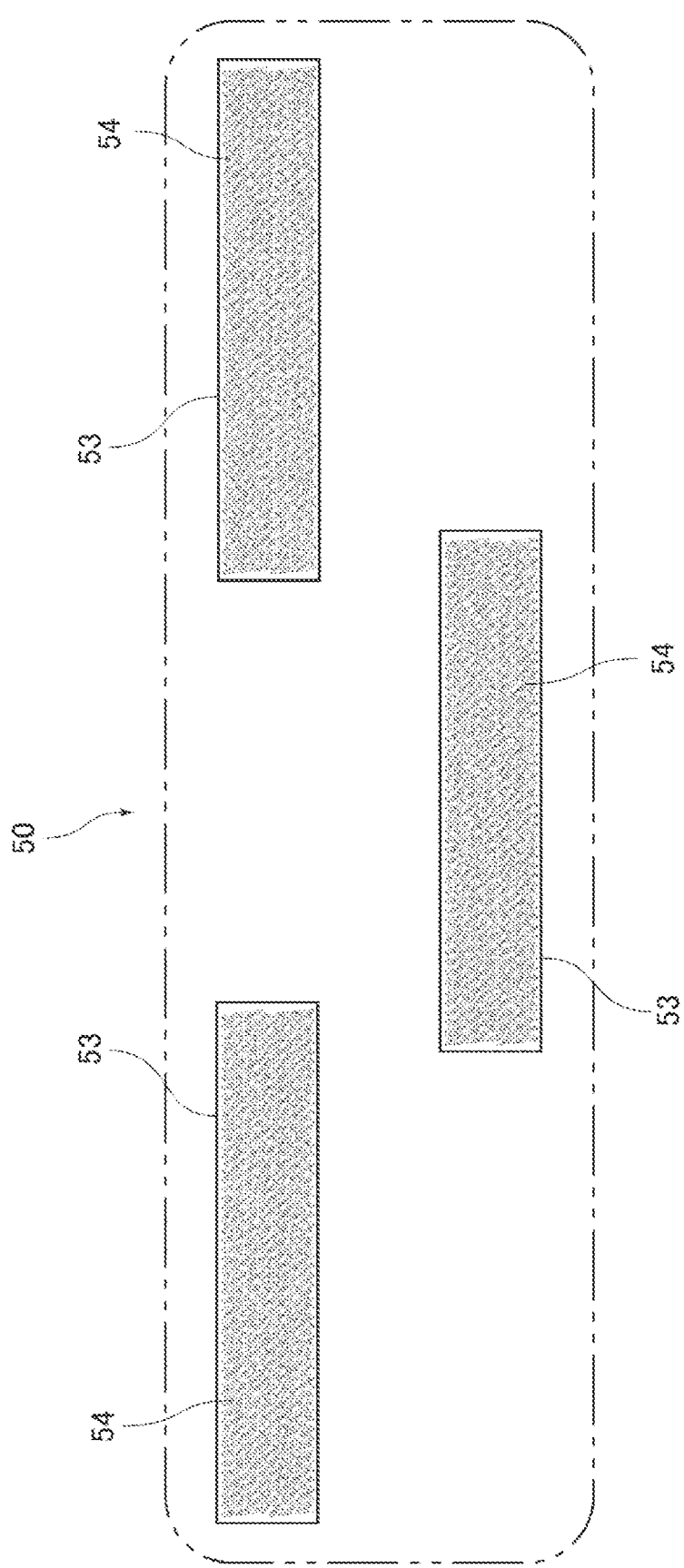
FIG. 8 is a diagram demonstrating a staggered arrangement of the nozzle heads in the inkjet coating machine shown in FIG. 1.

FIG. 7 is a front view of a nozzle spraying face 52 that sprays the paint in the nozzle head unit 50. As shown, the nozzle spraying face 52 includes a single nozzle head 53. However, the nozzle spraying face 52 also may include a head group consisting of a plurality of nozzle heads 53. In such case, the plurality of nozzle heads 53, for example, is provided in a staggered form as illustrated in FIG. 8. However, the arrangement of the nozzle heads 53 of the head group may not be staggered.

A plurality of nozzles 54 is provided at the nozzle head 53. In addition, a nozzle column 55 consisting of the plurality of nozzles 54 connected along a specified direction is provided at the nozzle head 53. The supply flow path of the paint towards the respective nozzles 54 is explained below.

Figure 9:
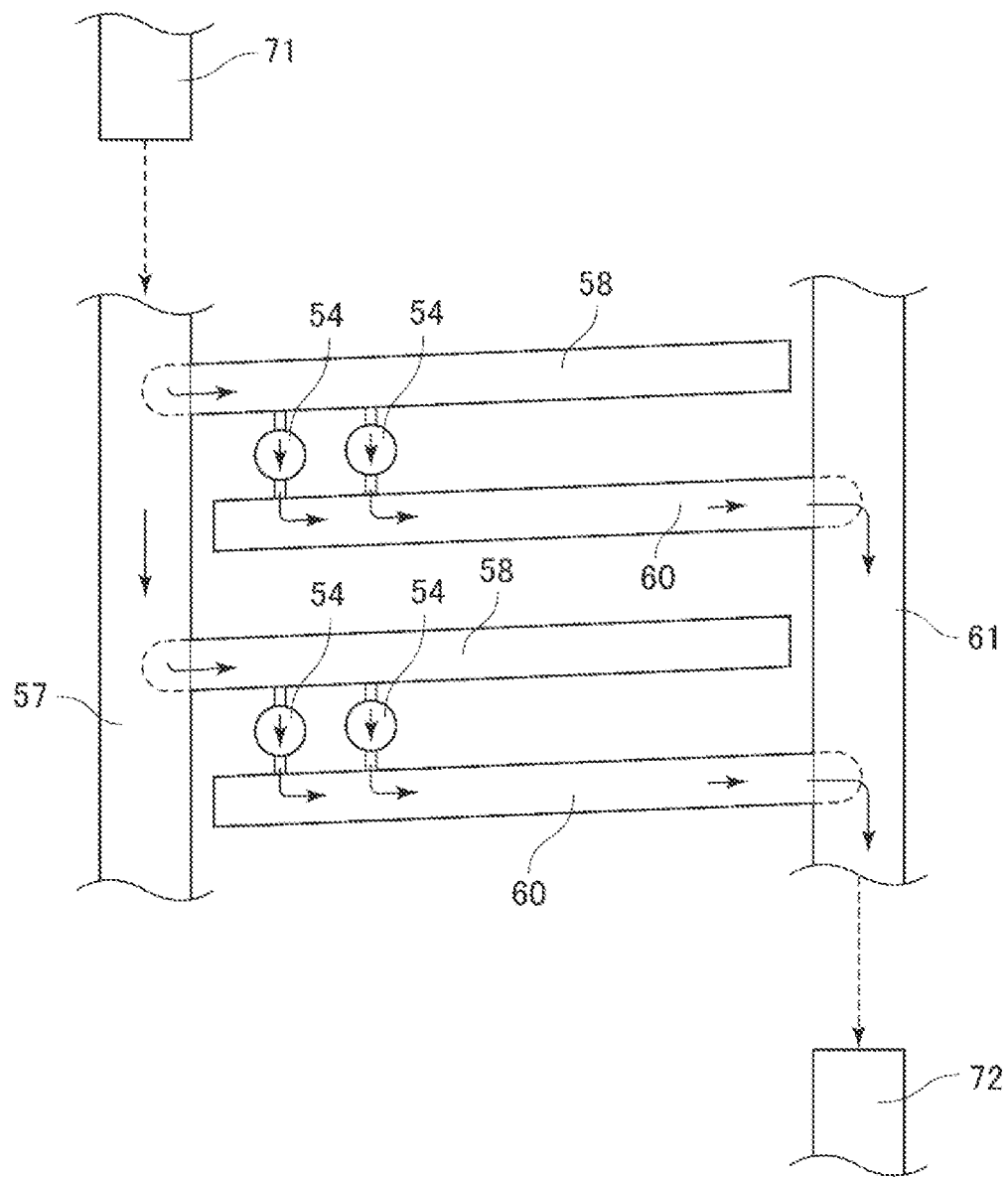
FIG. 9 is a schematic diagram illustrating the supply of the paint to respective nozzles in the inkjet coating machine shown in FIG. 1.
Figure 10:
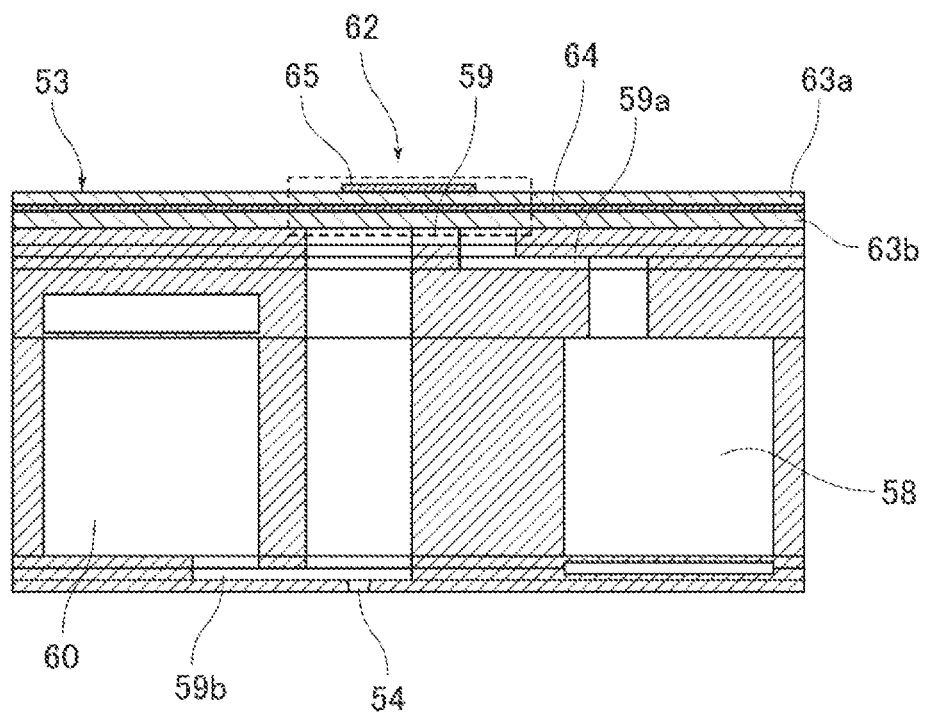
FIG. 10 is a sectional view of a structure in the vicinity of a column-wise supply flow path, a nozzle pressurizing chamber and a column-wise discharge flow path in the inkjet coating machine shown in FIG. 1.

FIG. 9 is a schematic diagram showing a structure of supplying the paint to each nozzle 54. FIG. 10 is a sectional view of a structure in the vicinity of a column-wise supply flow path 58, a nozzle pressurizing chamber 59 and a column-wise discharge flow path 60. According to FIGS. 9 and 10, the nozzle head 53 includes a supply-side main flow path 57, a column-wise supply flow path 58, a nozzle pressurizing chamber 59, a column-wise discharge flow path 60 and a discharge-side main flow path 61. The supply-side main flow path 57 a flow path through which paint is supplied from a supply path 71 of a head-side circulation path 70 described later. In addition, the column-wise supply flow path 58 is a flow path for branching the paint within the supply-side main flow path 57.

Besides, the nozzle pressurizing chamber 59 is connected to the column-wise supply flow path 58 via the nozzle supply flow path 59a. Accordingly, the paint is supplied from the column-wise supply flow path 58 to the nozzle pressurizing chamber 59. The number of the nozzle pressurizing chamber 59 is set in correspondence with the count of the nozzle 54, and the paint is sprayed from the nozzle 54 using the driving elements to be described later.

In addition, the nozzle pressurizing chamber 59 is connected to the column-wise discharge flow path 60 via the nozzle discharge flow path 59b. Therefore, the paint not sprayed from the nozzle 54 will not be sprayed from the nozzle pressurizing chamber 59 via the nozzle discharge flow path 59b towards the column-wise discharge flow path 60. The column-wise discharge flow path 60 is further connected with the discharge-side main flow path 61. The discharge-side main flow path 61 is where the paint sprayed from respective column-wise discharge flow paths 60 converges. The discharge-side main flow path 61 is also connected to the return path 72 of the head-side circulation path 70.

According to the above structure, the paint supplied from the supply path 71 of the head-side circulation path 70 is sprayed from the nozzle 54 via the supply-side main flow path 57, the column-wise supply flow path 58, the nozzle supply flow path 59a and the nozzle pressurizing chamber 59. Besides, the paint not sprayed from the nozzle 54 will return from the nozzle pressurizing chamber 59 via the nozzle discharge flow path 59b, the column-wise discharge flow path 60 and the discharge-side main flow path 61 to the return path 72 of the head-side circulation path 70.

In addition, in the structure shown by FIG. 9, one column-wise supply flow path 58 is configured in correspondence with one column-wise discharge flow path 60. However, it is also possible that one column-wise supply flow path 58 is configured to correspond to a plurality of (e.g., two) column-wise discharge flow paths 60. Further, a plurality of column-wise supply flow paths 58 may also be configured corresponding to one column-wise discharge flow path 60.

Moreover, a piezoelectric substrate 62 is configured on a top surface (opposite to the nozzle 54) of the nozzle pressurizing chamber 59 as illustrated in FIG. 10. The piezoelectric substrate 62 includes two piezoelectric ceramic layers 63a and 63b as piezoelectrics, a common electrode 64 and a single electrode 65, where piezoelectric ceramic layers 63a and 63b are elastic when an external voltage is applied. The above piezoelectric ceramic layers 63a and 63b may be made of ceramic materials, such as lead zirconate titanate (PZT), $NaNbO_3$, $BaTiO_3$, $(BiNa)NbO_3$ and $BiNaNb_5O_{15}$ etc.

As shown in FIG. 10, the common electrode 64 is interposed between the piezoelectric ceramic layers 63a and 63b. A surface electrode (not shown) for the common electrode is formed on an upper surface of the piezoelectric substrate 62. The above common electrode 64 and the surface electrode for common electrode are electrically connected via a penetrating conductor (not shown) of the piezoelectric ceramic layer 63a. In addition, the single electrode 65 is respectively provided at a position opposite to the above nozzle pressurizing chamber 59. A portion of the piezoelectric ceramic layer 63a sandwiched between the common electrode 64 and the single electrode 66 is polarized in the direction of thickness. Therefore, if a voltage is applied to the single electrode 65, the piezoelectric ceramic layer 63a deforms due to piezoelectric effects; and if a specified driving signal is applied to the single electrode 65, the piezoelectric ceramic layer 63b changes relatively to reduce the volume of the nozzle pressurizing chamber 59. The paint is thus sprayed.

Figure 11:
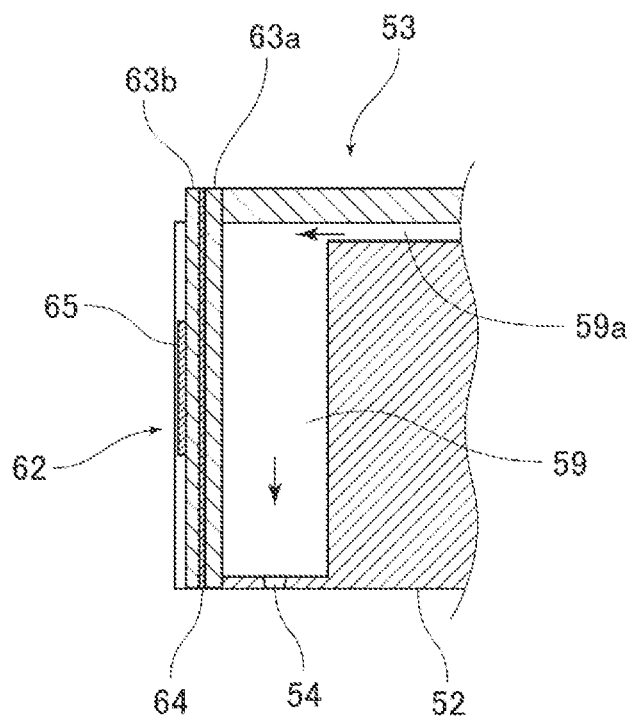
FIG. 11 is a sectional view of variants of the structure in the vicinity of a column-wise supply flow path, a nozzle pressurizing chamber and a column-wise discharge flow path shown in FIG. 10.

In the structure demonstrated by FIG. 10, the common electrode 64 is configured at the top surface of the nozzle pressurizing chamber 59. However, the structure is not restricted to the above form. For example, a structure where the common electrode 64 is provided at a side face of the nozzle pressurizing chamber 59 as shown in FIG. 11 may also be adopted. In addition, any structures may be used as long as the paint is well sprayed from the nozzle 54.

(1-5 Regarding Head-Side Circulation Path)

Figure 12:
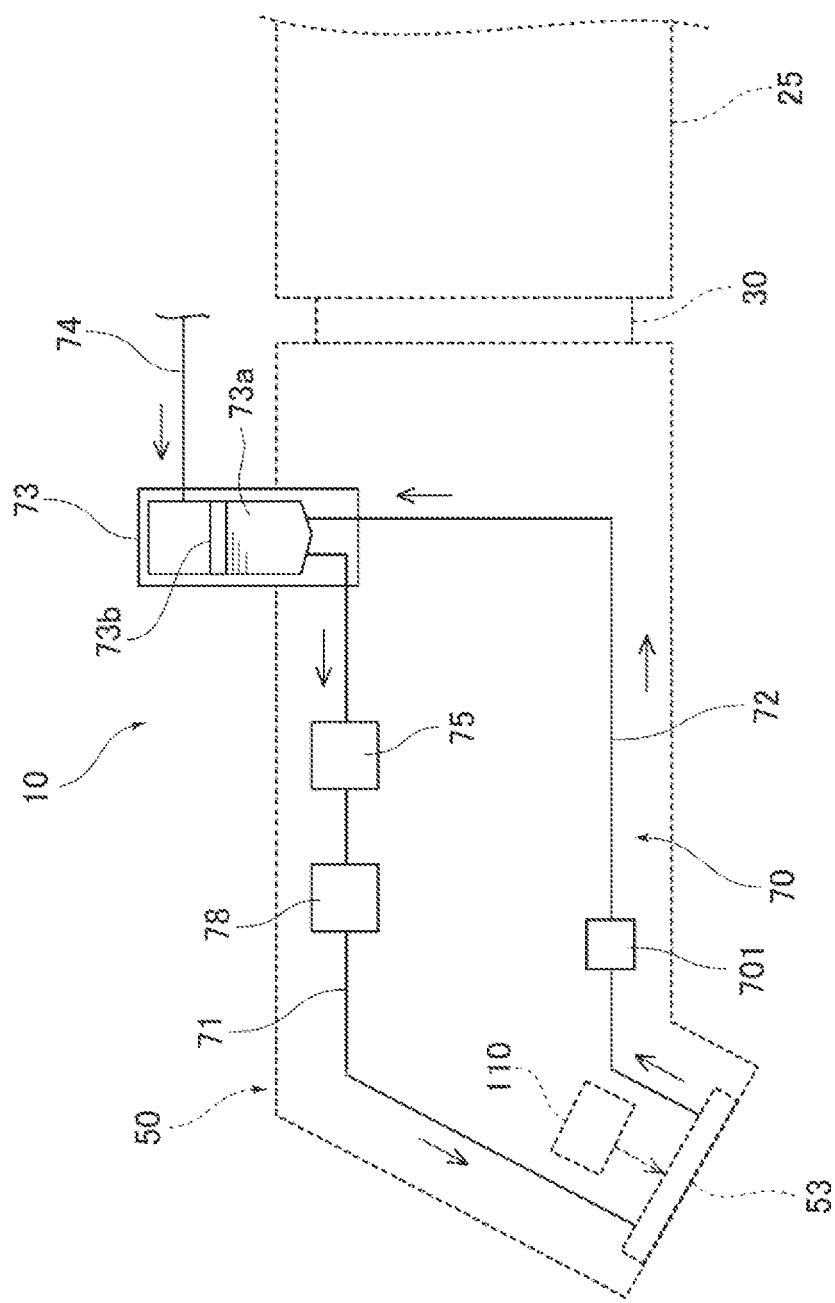
FIG. 12 is a schematic diagram showing the structure near the head-side circulation path in the inkjet coating machine shown in FIG. 1.

Next, the structure in the vicinity of the head-side circulation path 70 of the nozzle head unit 50 is explained. FIG. 12 is a schematic diagram showing the structure near the head-side circulation path 70. As shown, the nozzle head unit 50 is provided with the head-side circulation path 70 including the supply path 71 and the return path 72, where the supply path 71 is a flow path that feeds the paint supplied from the paint supply tank 73 to the nozzle head 53, and the return path 72 is a flow path through which the paint not sprayed from the nozzle hand 53 returns to the paint supply tank 73. Such head-side circulation path 70, for example, may adopt a structure in which a flexible tube is exposed from the nozzle head unit 50.

Besides, the paint supply tank 73 is linked to the supply path 71 and the return path 72. Inside a cylinder 73a of the paint supply tank 73, a piston 73b may be slidably provided relative to the cylinder 73a. Moreover, a liquid supply line 74 is connected to the cylinder 73a to feed liquid to the cylinder 73a from an extruding apparatus not shown. Accordingly, the piston 73b is pressed by extruding liquid from the extruding apparatus. The piston 73b can feed the paint accumulated within the cylinder 73a to the supply path 71. The extruding apparatus controls supply volume of the liquid through a supply volume control unit not shown. Representative examples of the liquid, for example, may include solvents like diluent. However, the liquid is not limited to the diluent. For example, when the paint is water-based, water and ethanol may act as the liquid. Furthermore, the extruding apparatus may not be limited to structures that press the piston 73b by extruding the liquid. The extruding apparatus, for example, also may be a structure that is driven by a motor to press the piston 73b.

The supply path 71 is provided with a fixed-volume supply apparatus 75, which supplies the paint at fixed volume on the basis of the flow detection in the sensor and may use, for example, gear pump or rotary pump. However, in replacement of the fixed-volume supply apparatus 75, a fixed voltage supply apparatus may be used. The fixed voltage supply apparatus supplies the paint at a fixed voltage like a diaphragm pump.

A paint regulator 78 is provided downstream of the fixed-volume supply apparatus 75 in the supply path 71. The paint regulator 78 eases the pulsation of the fixed-volume supply apparatus 75 and supplies the paint at a constant pressure. The paint regulator 78 regulates the opening degree of the valve by controlling the air pressure, so as to control the pressure at which the paint is supplied from cartridge 73B to the nozzle head 53 and the amount of the paint sprayed. Besides, air operated paint regulator (AOPR), and other regulators (such as electrically controlled electrodynamic regulator) may be used as the paint regulator 78.

In addition, a paint filter (not shown) is provided at the supply path 71 to remove foreign matters in the paint fed from the supply path 71 to the nozzle head 53. Further, the supply path 71 is also provided with a pressure sensor (not shown) that meters the pressure of the paint extruded from the piston 73b. Therefore, the operation of the piston 73b is controlled based on the pressure measurement made by the pressure sensor.

(1-7 Regarding Control Unit)

The control unit of the inkjet coating machine 10 in accordance with this implementation is described below. The control unit includes a main body control unit 100, a nozzle control unit 110 and a cleaning control unit 120, where the main body control unit 100 is responsible for controlling respective driving units of the coating apparatus main body 20. Examples of such driving units may include motors for driving various driving units of the pivot arm 23, first rotating art 24, second rotating arm 25 and wrist 26 of the coating apparatus main body 20 etc. Besides, the main body control unit 100 corresponds to the main body control unit. The nozzle control unit 110 controls the driving of the nozzle head 53 based on a command from the main body control unit 100. The nozzle control unit 110 corresponds to nozzle control unit. The nozzle control unit 110 controls the driving of the piezoelectric substrate 62, the cylinder 73a, and the fixed-volume supply apparatus 75 of the nozzle head 53.

The cleaning control unit 120 controls the actuations of the respective parts of the work station 200 in response to an instruction from the nozzle control unit 110. The actuations of the cleaning mechanism 210, the processing unit 220, and the like, which will be described later, are controlled by the cleaning control unit 120.

The coating system 1 of the implementation further includes an overall control unit 130. The overall control unit 130 sends control instructions to the main body control unit 100, the nozzle control unit 110, and the cleaning control unit 120, and takes charge of the overall control of the coating system 1. The main body control unit 100, the nozzle control unit 110, the cleaning control unit 120, and the overall control unit 130 mainly consist of a CPU, a memory (such as ROM, RAM, or nonvolatile memory), and other elements.

(1-8 Regarding Work Station)

Next, the work station 200 will be explained. As shown in FIG. 1, a coating system 1 having an inkjet coating machine 10 includes a work station 200. The work station 200 stores the nozzle head unit 50 to be replaced in the standby holding unit 230. Specifically, a standby holding unit 230 for holding one or more nozzle head units 50 in a standby state is provided on a top panel 202 of a frame 201 constituting the work station 200. Preferably, a concave part or a convex part is provided at the top panel 202 of the standby holding unit 230 to locate each nozzle head unit 50. The standby holding unit 230 not only corresponds to a head standby holding unit holding the nozzle head unit 50 in standby, but also functions as a cartridge holding unit holding the cartridge 73B to be described later in standby. However, the cartridge holding unit also may be provided at a position different from the standby holding unit 230.

Besides, the work station 200 is also provided with a cleaning mechanism 210, which cleans the nozzle head 53 that is polluted by the sprayed paint, and a processing unit 220. The processing unit 20 is used for holding and moving the nozzle head 53 and corresponds to the head replacement unit. In addition, the processing unit 220 also corresponds to a cartridge replacement unit for replacing the cartridge 73B to be described later. However, the unit other than the processing unit 220 may also correspond to the cartridge replacement unit.

Besides, two work stations 200 are set in the structure shown by FIG. 1. In contrast, it is also feasible to provide only one work station 200, or more than three work stations 200.

(1-9 Regarding Acts of the Coating System)

Acts of the coating system 1 having the above structure are explained below.

If receiving from the overall control unit 130 a control signal indicating the start of coating, the main body control unit 100 first controls the actuations of the pivot arm 23, the first rotating arm 24, the second rotating arm 25 and the wrist 26 etc., causing the nozzle head unit 50 to move towards a spray position in standby (idling). Then, according to the control signal from the overall control unit 130, the nozzle control unit 110 causes the paint to be sprayed from the nozzle 54. The paint is sprayed to fill in the nozzle 54, remove foreign matters from the nozzle 54 and prevent the paint from drying at an end face of the nozzle 54. At this stage, no paint is sprayed to the coating object, i.e., the vehicle.

When the paint is being sprayed from the above nozzle 54, the nozzle control unit 110 operates the extruding apparatus to extrude the piston 73b, so as to feed the paint to the supply path 71. Besides, the fixed-volume supply apparatus 75 operates in such a way that the paint circulates in the head-side circulation path 70 and the piezoelectric substrate 62 is enabled to work, thereby spraying the paint from the nozzle 54. In the above scenario where the paint is sprayed from the nozzle 54 at a standby (idle) spray position, the piezoelectric substrate 62 is driven by spraying the paint. As illustrated in FIG. 12, a seal valve 701 may be provided at the side of the return path 72. When the seal valve 701 is turned off and the fixed-volume supply apparatus 75 is in operation, the paint is forced out from the nozzle 54 at the fixed volume. After the paint is sprayed from the nozzle 54, a spray face 52 of the nozzle is preferably cleaned.

After the spray preparation is completed by filling the nozzle 54 with the paint, in the operating state of the above-described coating apparatus main body 20, a vehicle is detected by a sensor not shown as coating object. When the vehicle reaches a specified coating start position, the nozzle control unit 110 operates the piezoelectric substrate 62 to spray the paint and starts coating the vehicle. The main body control unit 100, together with the piezoelectric substrate 62, is operated to control the actuations of the pivot arm 23, the first rotating arm 24, the second rotating arm 25, the wrist portion 26 and the like. In such a way, each component of the vehicle is coated.

When the overall control unit 130 indicates a change of the type of paint, e.g., change in color at the completion of the vehicle coating, the main body control unit 100 controls the actuations of the pivot arm 23, the first rotating arm 24, the second rotating arm 25, the wrist portion 26 and the like, causing the nozzle head unit 50 to move to a specified position of the work station 200. The processing unit 220 holds the nozzle head unit 50 that has performed the coating so far. At this time, the main body control unit 100 and the nozzle control unit 110 control the driving source to carry out actuations. If the actuations cause the cam piston body 35 to move to the underside as indicated by FIG. 6, a chuck release state is achieved, i.e., the interference between the interference part 37b and the snapfit pin 45 is released.

Accordingly, the nozzle head unit 50 is detached from the chuck 30 via the processing unit 220. Following the detachment, the processing unit 220 transports the nozzle head unit 50 to the cleaning mechanism 210, within which cleaning mechanism 210, the surface of the nozzle head 53 and the interior of the nozzle head unit 50 (e.g., head-side circulation path 70 etc.) are cleaned.

When the cleaning is done, the processing unit 220 transports the nozzle head unit 50 to a filling position where the paint is filled. Besides, a paint filling unit not shown is used for filling the paint supply tank 73 with paint. Moreover, the paint may be filled at the cleaning position without moving the nozzle head unit 50 by the processing unit 220. When the filling is completed, the processing unit 220 transports the nozzle head unit 50 to a specified standby position on the top panel 202.

Besides, when the interior of the paint supply tank 73 can be easily cleaned, the interior of the paint supply tank 73 may be cleaned at the same time. In such case, after the cleaning of the interior of the paint supply tank 73, the paint supply tank 73 is filled with paint. However, if the nozzle head unit 500 corresponds to a given paint (such as a dedicated color type), the paint supply tank 73 is filled with the paint without cleaning the interior of the paint supply tank 73.

For another aspect, after the processing unit 220 transports the nozzle head unit 50 to the cleaning mechanism 210, the processing unit 220 holds the nozzle head unit 50 in standby placed on the standby holding unit 230. The paint supply tank 73 mounted at the nozzle head unit 50 is stored with paint different from the one in the paint supply tank 73 of the nozzle head unit 50 used before replacement. Therefore, a different type of paint may be sprayed using a new nozzle head unit 50.

The processing unit 220 transports the above new nozzle head unit 50 to the chuck 30 for engagement between the arm-side snapfit 31 and the head-side snapfit 41. At this time, the main body control unit 100 and the nozzle control unit 110 control the driving source to carry out actuations. If the actuations cause the cam piston body 35 to move to the upside as indicated by FIG. 6, the interference part 37b is snap-fitted with the snapfit pin 45.

Thereafter, the new vehicle is coated following the above acts. When the coating is performed with the new nozzle head unit 50, different types of paints may be sprayed like color change. However, the same type of paint as the one used in the nozzle head unit 50 before replacement may also be sprayed.

The coating system 1 and the inkjet coating machine 10 having the above structure include: a robot arm (consisting of pivot shaft 22a, pivot arm 23, first rotating arm 24, second rotating arm 25 and wrist 26) having a chuck 30 at a front end. Besides, the inkjet coating machine 10 comprises a nozzle head unit 53 detachably mounted on the chuck 30 and including a nozzle head 53 having a nozzle for spraying the paint, a nozzle control unit (nozzle control unit 110) for controlling driving of the nozzle head 53, and a head-side circulation path 70 enabling the paint to circulate within the nozzle head 53, wherein the nozzle head 53, the nozzle control unit (nozzle control unit 110) and the head-side circulation path 70 are integrally configured and detachably mounted with respect to the chuck 30. The inkjet coating machine 10 also includes: a head standby holding unit (standby holding unit 230) that holds at least one nozzle head unit 50 in standby; and a head replacement unit (processing unit 220) that replaces the nozzle head unit 50 mounted on the chuck 30 with the nozzle head unit 50 held by the head standby holding unit (standby holding unit 230).

Accordingly, the paint can circulate via the head-side circulation path 70, to avoid precipitation of the components in the paint. As a result, the clogging in the components of the nozzle 54 resulted from the precipitation also can be avoided.

In comparison to the color change valve in the existing coating machine, the waste paint and the cleaning liquid can be reduced in case of the change of the type of paint, such as color change. In the present implementation, the cleaning can be performed at other positions by replacing the nozzle head unit 50. Accordingly, compared to a structure in which a color change valve device is provided in a conventional coating machine and the cleaning is performed downstream of the color change valve, the new nozzle head unit 50 can be replaced in a shorter time than the time required for cleaning. Therefore, the time for the preparation stage of coating is shortened.

Besides, the nozzle head unit 50 may be attached and detached via the chuck 30. For example, in case of the change in paint type, e.g., color change, the nozzle head unit 50 that has been used so far would be easily detached from the chuck 30, and the new nozzle head unit 50 could be conveniently mounted to the chuck 30. Hence, the nozzle head unit 50 that has been used so far will be cleaned at other places.

If the nozzle head unit 50 cannot be detached from the chuck 30 due to the complicated internal structure, it costs a lot of time to clean the interior of the nozzle head unit 50. As a result, the coating process using the inkjet coating machine 10 will also be interrupted. In contrast, in the present implementation, the nozzle head unit 50 is detached via the chuck 30 and then cleaned at other places. In such case, the interior of the nozzle head unit 50 is cleaned without interrupting the coating process, which improves the time efficiency of the coating process by means of the inkjet coating machine 10. In addition, the coating continues by attaching a new nozzle head unit 50.

Further, in the inkjet coating machine 10 of the implementation, the nozzle head unit 50 is provided with a paint storage unit (paint supply tank 73) storing paint sprayed from the nozzle 54. The paint storage unit is connected, in a state in which the paint can be supplied, to the head-side circulation path 70.

Accordingly, it is unnecessary to provide, for example, a path for feeding paint (arm-side path) from the side of the second rotating arm 25 to the nozzle head unit 50. When the type of paint is changed such as color change, the arm-side path does not need to be cleaned, and the paint waste and the cleaning liquid can be reduced accordingly. In addition, compared with a structure in which the color change valve is used in the existing coating machine, the time required for cleaning is reduced.

Further, in the inkjet coating machine 10 of the implementation, the paint storage unit is a paint supply tank 73 integrated with the nozzle head unit 50, and the head-side circulation path 70 enables the paint to circulate between the head-side circulation path and the paint supply tank 73.

Therefore, in case of the change in paint type, e.g., color change, the nozzle head unit 50 and the paint supply tank 73 (paint storage unit) can be replaced by an one-off detachment via the chuck 30. Further, the new nozzle head unit 50 and the paint storage unit (paint supply tank 73) may be mounted by an one-off mounting via the chuck 30 to implement coating. The new nozzle head unit 50 mounted at the chuck 30 also can enable the paint stored in the paint storage unit (paint supply tank 73) to reliably spray from the nozzle 54 via the head-side circulation path 70.

Additionally, in the inkjet coating machine 10 of the implementation, the paint supply tank 73 causes the paint from the nozzle head 53 to return to the paint supply tank 73 by connecting to the head-side circulation path 70 at one end. A cylinder 73a storing the paint and a piston 73b sliding within the cylinder 73a are provided within the paint supply tank 73. An extruding apparatus is provided for pressing the piston 73b in the cylinder 73a. A supply volume control unit for controlling actuations of the extruding apparatus is provided. Besides, the supply volume control unit controls actuations of the extruding apparatus that extrudes the piston 73b in accordance with supply volume of the paint fed to the nozzle head 53 and return volume of the paint returning from the nozzle head 53.

The extruding apparatus is operated to press the piston 73b, to supply the paint stored within the cylinder 73a to the side of the supply path 71 at a desired amount.

[Second Implementation]
(2-1 Regarding the Structure of the Inkjet Coating Machine in Accordance with the Second Implementation)

Next, the overall structure of the inkjet coating machine in accordance with the second implementation of the present invention is explained. Besides, throughout the second implementation, the same components as those in the above first implementation are indicated with the same reference signs and related description is omitted. However, a letter "B" is added to the reference signs used in the second implementation to distinguish from the first implementation.

Figure 13:
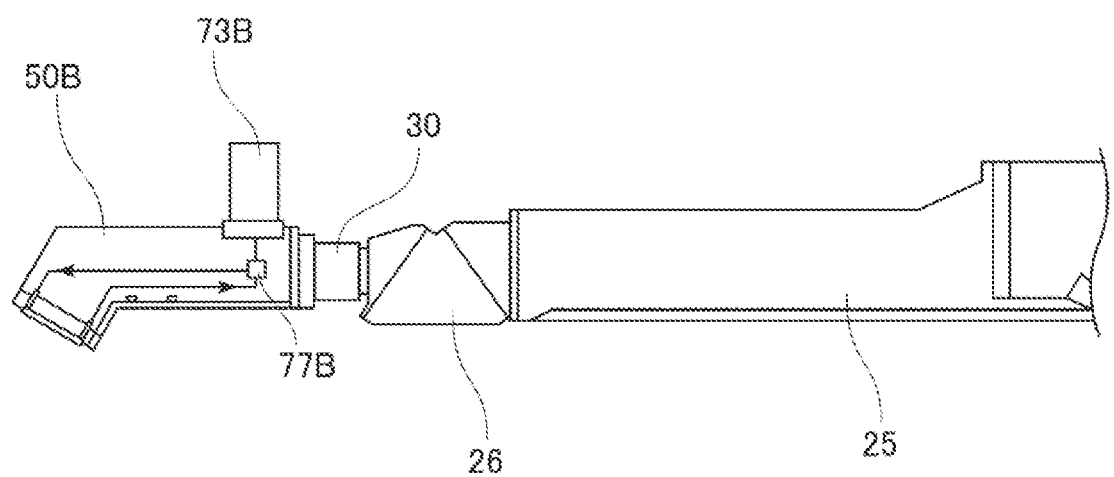
FIG. 13 illustrates a lateral view of a structure of the inkjet coating machine in accordance with the second implementation of the present invention starting from the second rotating arm to the nozzle head unit.
Figure 14:
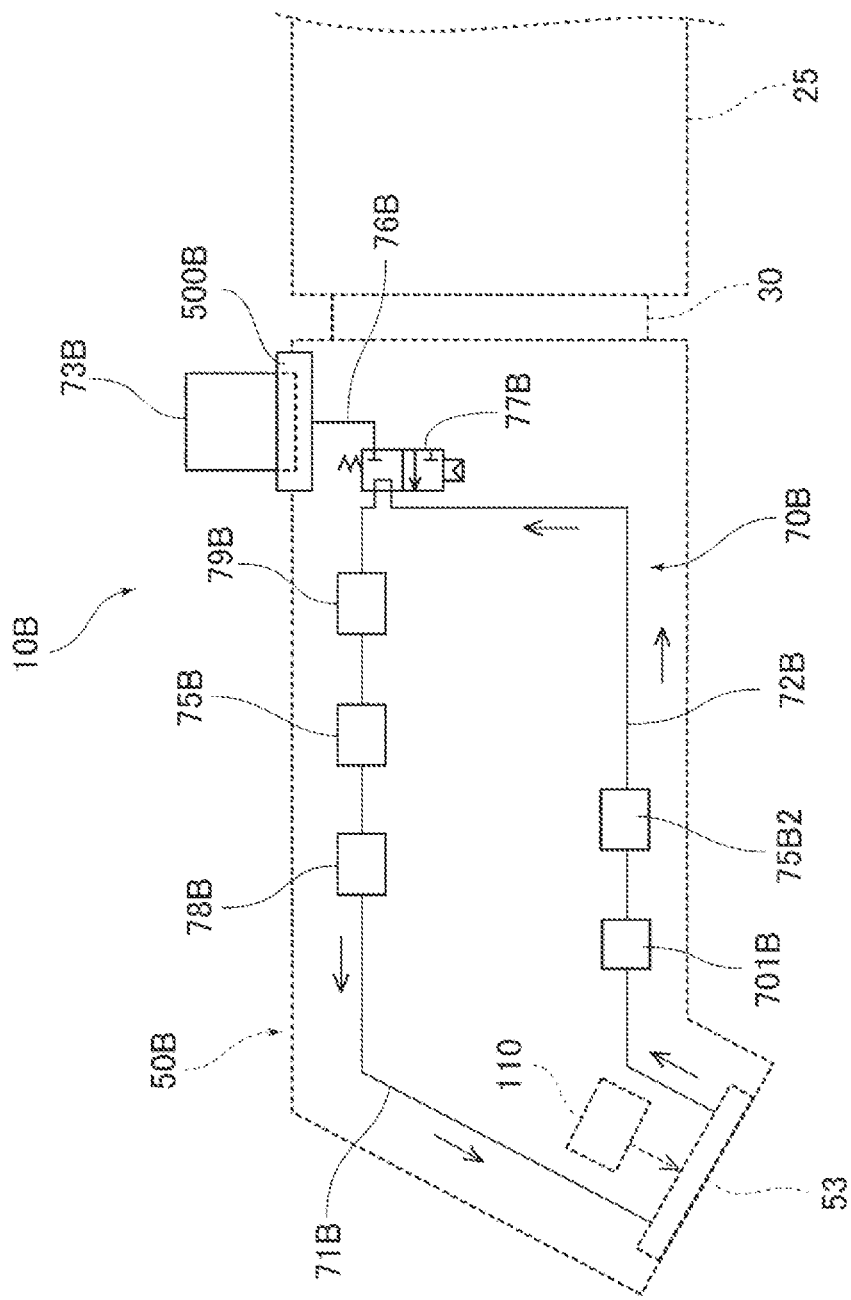
FIG. 14 is a schematic diagram of the structure of the head-side circulation path in the inkjet coating machine shown in FIG. 13.

In the above the inkjet coating machine 10 in accordance with the first implementation, the paint supply tank 73 is integrally fixed to the nozzle head unit 50. In contrast, the cartridge 73B is detachably configured with respect to the nozzle head unit 50 in the inkjet coating machine 10B of this implementation as indicated by FIGS. 13 and 14. Specifically, FIG. 13 illustrates a lateral view of a structure of the inkjet coating machine 10B in accordance with the second implementation of the present invention starting from the second rotating arm 25 to the nozzle head unit 50B. Besides, FIG. 14 is a schematic diagram of the structure of the head-side circulation path 70.

As shown in FIGS. 13 and 14, a cartridge mounting unit 500B for carrying the cartridge 73B stored with paint is provided at the nozzle head unit 50B of the inkjet coating machine 10B in accordance with the second implementation. The cartridge mounting unit 500B is basically configured to mount a single type of cartridge 73B as the paint. Accordingly, in case of the change in the type of paint, the nozzle head unit 50B also needs to be replaced.

Besides, when the cartridge mounting unit 500B mounts only one type of cartridge 73B, a plurality of cartridges 73B of the same type may also be mounted. Further, in addition to mounting one type of cartridge 73B, the cartridge mounting unit 500B also may mount multiple types of cartridges 73B. For example, the cartridge mounting unit 500B may mount a cartridge 73B storing the paint of a particular color and a cartridge 73B storing the cleaning liquid used for cleaning.

The cartridge mounting unit 500B for mounting the cartridge 73B is linked to a connection flow path 76B used for connection to the head-side circulation path 70B. A three-way valve 77B is connected to the connection flow path 76B, and switches its operation during coating so that paint is supplied from the cartridge 73B through the connection flow path 76B. When the paint is not sprayed from the nozzle head 53, the valve is such switched that the paint returning to the return path 72B without being sprayed from the nozzle head 53 is supplied (flows) to the supply path 71B, causing the paint to circulate within the head-side circulation path 70B. Accordingly, the paint continues to circulate even when no paint is sprayed from the nozzle head 53, to avoid precipitation of the components in the paint. Further, depending on the type of the paint, the viscosity of the paint sometimes may also reduce when the paint flows.

However, the cartridge 73B is not provided with the above unit for extruding paint corresponding to the piston 73b. A paint regulator 78B, identical to the paint regulator 78, is provided at the supply path 71B of the head-side circulation path 70B. Further, a fixed-volume supply apparatus 75B, same as the above fixed-volume supply apparatus 75, is provided at the supply path 71B of the head-side circulation path 70B. According to FIG. 14, a fixed-volume supply apparatus 75B2, same as the fixed-volume supply apparatus 75B, is preferably provided at the return path 72B. However, the return path 72B without such fixed-volume supply apparatus 75B2 may also be adopted. Moreover, although a seal valve 701B identical to the seal valve 701 is preferably provided at the return path 72B, a structure without the seal valve 701B may also be adopted.

Besides, a sub-tank 79B for storing the paint is provided between the three-way valve 77B and the paint regulator 78B. The sub-tank 79B acts as a buffer to smooth the circulation of the paint inside the head-side circulation path 70B. That is, the paint supplied from the cartridge 73B will not return to the side of cartridge 73B after passing the three-way valve 77B. Accordingly, if the paint is supplied via the paint regulator 78B in an amount greater than the sprayed amount, a failure such as suspension of the paint circulation may be induced. To this end, the sub-tank 79B is provided at the supply path 71 as the buffer for storing the paint. Therefore, even when the storage amount of the paint in the sub-tank 79B changes, the paint still can be sprayed from the nozzle head 53 without affecting the circulation of the paint inside the head-side circulation path 70B.

(2-2 Regarding Acts of the Coating System)

The coating using the inkjet coating machine 10B according to the second implementation can be performed in the same manner as the inkjet coating machine 10 according to the first implementation described above.

When the coating of the vehicle is completed, the nozzle head unit 50B is detached from the chuck 30 as described in the first implementation in case of change of paint type, e.g., change in color. Following the detachment, a new nozzle head unit 50B is mounted to the chuck 30 via the processing unit 220. The coating of a new vehicle is then performed using the new nozzle head unit 50B.

The cartridge 73B is further removed from the nozzle head unit 50, which is already detached from the chuck 30. After the removal of the cartridge 73B, the nozzle head unit 50B is transported to the cleaning mechanism 210 by the processing unit 220. The surface of the nozzle head 53 and the interior of the nozzle head unit 50B (such as head-side circulation path 70 etc.) are cleaned within the cleaning mechanism 210. When the cleaning is completed, a new cartridge 73B is mounted to the cartridge mounting unit 500B of the nozzle head unit 50B. Afterwards, the nozzle head unit 50B is transported by the processing unit 220 to the standby holding unit 230.

In addition, the processing unit 220 also transports the used cartridge 73B (removed from the nozzle head unit 50B) to the cleaning mechanism 210, in which the used cartridge 73B is cleaned. Then, the processing unit 220 transports the cleaned cartridge 73B to a filling position where the paint is to be filled. The cartridge 73B is filled with the paint using the paint filling unit not shown. However, the cartridge 73B may also be filled with paint at the cleaning position. When the filling is completed, the processing unit 220 transports the cartridge 73B filled with the paint to the standby holding unit 230.

In the coating system 1 and the inkjet coating machine 10B having the above structure, the paint storage unit is a cartridge 73B for storing the paint. Besides, the nozzle head 53 is provided with a cartridge mounting unit 500B, to/from which the cartridge 73B may be attached or detached freely.

Accordingly, the change of the type of paint, e.g., color change, can be implemented only by replacing the cartridge 73B with respect to the nozzle head unit 50B. In such case, it is unnecessary to prepare the nozzle head unit 50B in accordance with each coating color, which reduces the number of the nozzle head unit 50B.

Further, in the inkjet coating machine 10B of the second implementation, a cartridge standby holding unit (standby holding unit 230) is provided for holding the cartridge 73B in standby. Besides, a cartridge replacement unit (processing unit 220) is also configured to replace the cartridge 73B mount on the cartridge mounting unit 500B with the cartridge 73B held by the cartridge standby holding unit (standby holding unit 230).

Hence, the cartridge 73B can be easily replaced via the cartridge replacement unit (processing unit 220) without manual intervention.

[Third Implementation]

(3-1 Regarding the Structure of the Inkjet Coating Machine in Accordance with the Third Implementation)

Next, the overall structure of the inkjet coating machine in accordance with the third implementation of the present invention is explained below. Besides, throughout the third implementation, the same components as those in the above first and second implementations are indicated with the same reference signs and the related description is omitted. However, a letter "C" is added to the reference signs used in the third implementation to distinguish from the first and second implementations.

Figure 15:
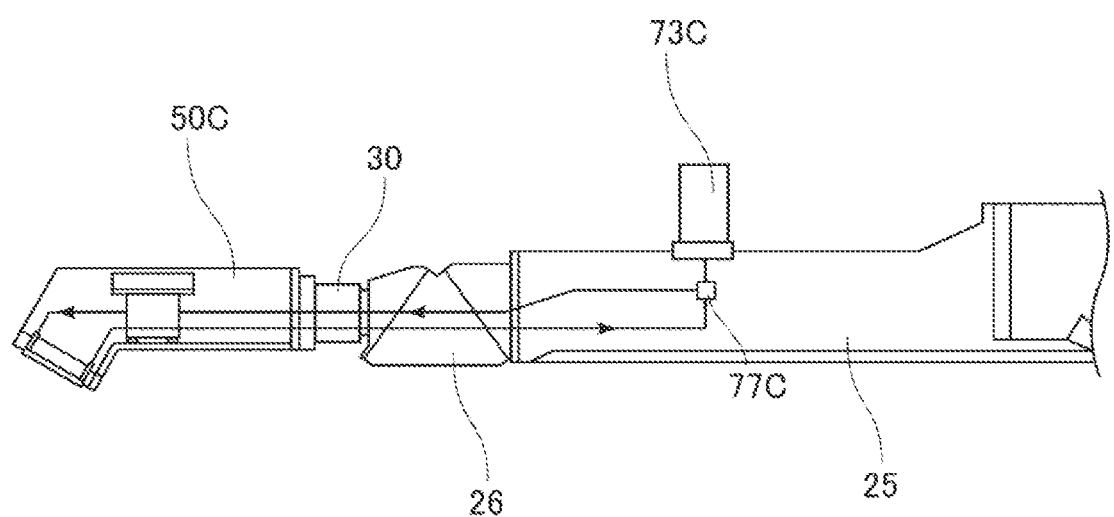
FIG. 15 illustrates a lateral view of a structure of the inkjet coating machine in accordance with the third implementation of the present invention starting from the second rotating arm to the nozzle head unit.

In the inkjet coating machine 10C in accordance with the third implementation, a cartridge 73C is provided at the second rotating arm 25, rather than the nozzle head unit 50C. FIG. 15 illustrates a lateral view of a structure of the inkjet coating machine 10C in accordance with the third implementation of the present invention starting from the second rotating arm 25 to the nozzle head unit 50C. Besides, FIG. 16 is a schematic diagram illustrating the structure of the head-side circulation path 70C and the arm-side circulation path 80C.

Figure 16:
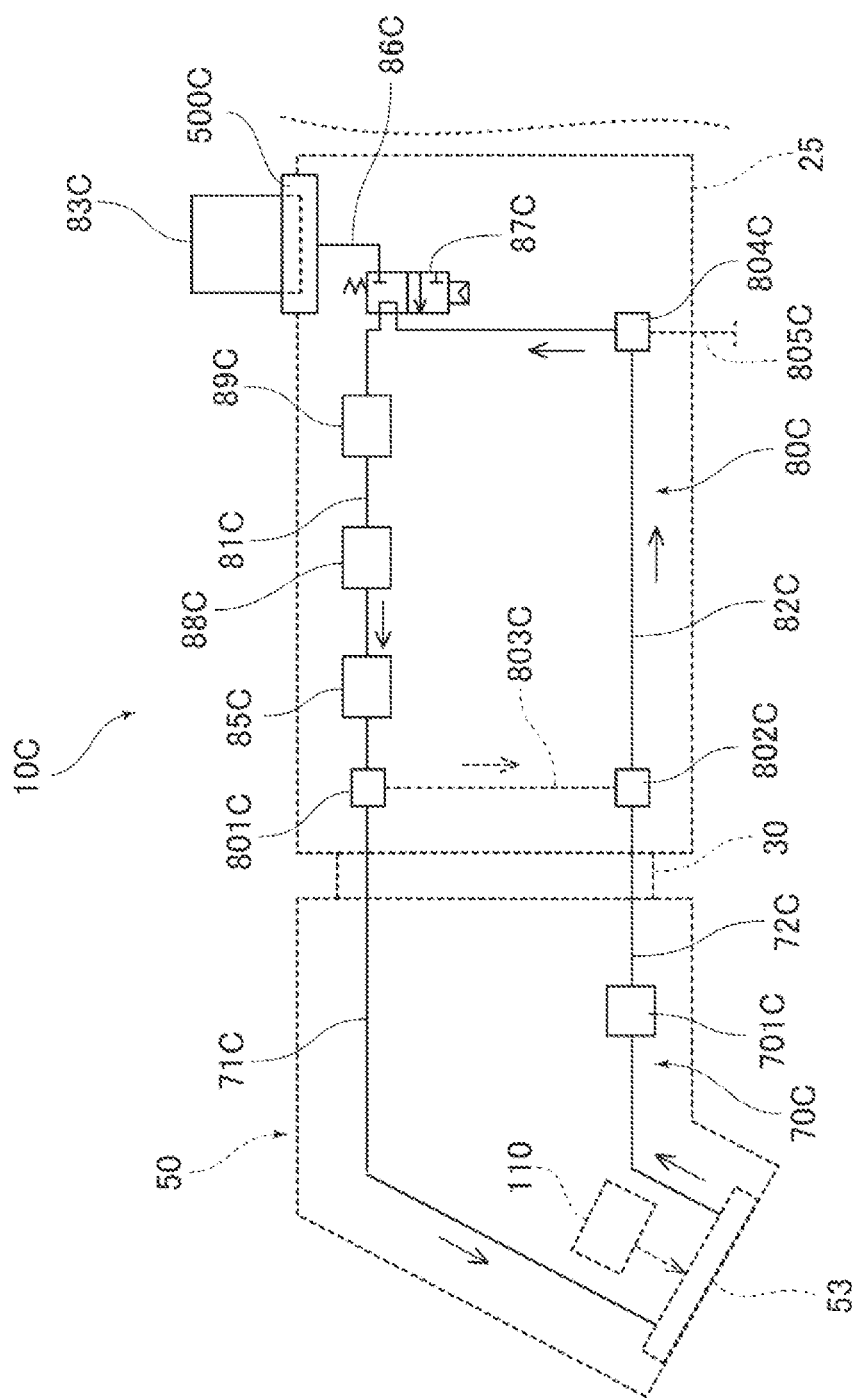
FIG. 16 is a schematic diagram illustrating the structure of the head-side circulation path, the arm-side circulation path and the color changing valve in the inkjet coating machine shown by FIG. 15.

As shown in FIGS. 15 and 16, a head-side circulation path 70C is provided at the nozzle head unit 50C of the inkjet coating machine 10c in accordance with the third implementation. The head-side circulation path 70C also includes a supply path 71C and a return path 72C like the above head-side circulation paths 70 and 70B. However, the head-side circulation path 70C does not constitute the circulation path only in the nozzle head unit 50C. That is, the supply path 71C is connected to a supply path 81C of the arm-side circulation path 80C to be described later. In addition, the return path 72C is also connected to a return path 82C of the arm-side circulation path 80C to be described later. Although a seal valve 701C identical to the seal valve 701 is preferably provided at the return path 72C, a structure without the seal valve 701C may also be adopted.

Further, the arm-side circulation path 80C is provided at the second rotating arm 25, where the arm-side circulation path 80C includes a supply path 81C connected to the above supply path 71C and a return path 82C connected to the above return path 72C. The supply path 81C and the return path 82C are linked to a three-way valve 87C identical to the above mentioned three-way valve 77B. Additionally, the supply path 81C corresponds to the arm-side supply path and the return path 82C corresponds to the arm-side return path.

A cartridge mounting unit 500C, same as the above cartridge mounting unit 500B, is provided at the second rotating arm 35. The cartridge mounting unit 500C is linked to a connection flow path 86C for connection to the arm-side circulation path 80C, the connection flow path 86C being identical to the above mentioned connection flow path 76B and further connected to the three-way valve 87C. Accordingly, the three-way valve 87C switches its operation during coating so that paint is supplied from the cartridge 83C through the connection flow path 86C. In contrast, when no paint is sprayed from the nozzle head 53, the three-way valve 87C is such switched that the paint circulates in the head-side circulation path 70C and the arm-side circulation path 80C.

Accordingly, just like the inkjet coating machine 10B described in the above second implementation, the paint continues to circulate even when no paint is sprayed from the nozzle head 53, to avoid precipitation of the components in the paint. Further, depending on the type of the paint, the viscosity of the paint sometimes may also reduce when the paint flows.

Further, instead of disposing at the side of the robot arm (second rotating arm 25), the paint storage unit (cartridge 83C) also may be configured near the coating apparatus main body 20.

A fixed-volume supply apparatus 85C, same as the above fixed-volume supply apparatuses 75B provided at the supply path 71B, is provided at the supply path 81C. In addition, the supply path 81C is also provided with a paint regulator 88C, identical to the above paint regulator 78B on the supply path 71B, and a sub-tank 89C same as the sub-tank 79B. Therefore, even when the storage amount of the paint in the sub-tank 89C changes, the circulation of the paint in the arm-side circulation path 80C and the head-side circulation path 70C will not be affected. Hence, the circulating paint can be well sprayed from the nozzle head 53.

In the structure demonstrated by FIG. 16, at least one of the fixed-volume supply apparatus 85C, the paint regulator 88C and the sub-tank 89C may be provided at the supply path 71C of the head-side circulation path 70C.

Further, a switching valve 801C may be provided downstream of the paint regulator 88C in the supply path 81C and a switching valve 802C also may be connected to the return path 82C. The switching valves 801C and 802C are connected via a bypass passage 803C. Besides, when the nozzle head unit 50C is detached, the switching valves 801C and 802C are such switched that the cleaning liquid supplied from the cleaning unit (not shown) flows in the bypass passage 803C. Due to the presence of the bypass passage 803C, only the arm-side circulation path 80C is cleaned after the detachment of the nozzle head unit 50C. A switching valve 804C is also provided at the return path 82C. After being cleaned, the switching valve 804C is connected to a discharge path 805C for discharging the cleaning liquid (waste liquid). In such way, the waste liquid may be discharged from the discharge path 805C.

(3-2 Regarding Acts of the Coating System)

a. The coating using the inkjet coating machine 10C according to the third implementation can be performed in the same manner as the inkjet coating machine 10B according to the second implementation described above.

When the coating of the vehicle is completed, the nozzle head unit 50C is detached from the chuck 30 as described in the first implementation in case of change of paint type, e.g., color change. The cartridge 83C is also removed from the second rotating arm 25. Following the detachment, a new nozzle head unit 50C is mounted to the chuck 30 via the processing unit 220. Besides, the new cartridge 83C is mounted to the cartridge mounting unit 500C via the processing unit 220. After the above amounting, the coating of a new vehicle is performed using the new nozzle head unit 50C.

Besides, similar to the nozzle head unit 50B, the detached nozzle head unit 50C is transported by the processing unit 220 to the cleaning mechanism 210, in which the surface of the nozzle head 53 and the interior of the nozzle head unit 50C (such as head-side circulation path 70 etc.) are cleaned. Afterwards, the nozzle head unit 50C is transported to the standby holding unit 230 by the processing unit 220. When the nozzle head unit 50C is detached from the chuck 30, the valves 801C and 802C switch its operation such that the cleaning liquid flows in the bypass passage 803C. Additionally, when the cleaning is completed, the switching valve 804C is switched to discharge the waste liquid from the discharge path 805C.

In addition, the processing unit 220 also transports the used cartridge 83C (removed from the cartridge mounting unit 500C of the second rotating arm 25) to the cleaning mechanism 210, in which the used cartridge 83C is cleaned. Then, the processing unit 220 transports the cleaned cartridge 83C to a filling position where the paint is to be filled. The cartridge 83C is filled with the paint using the paint filling unit not shown. However, the cartridge 83C may also be filled with paint at the cleaning position. When the filling is completed, the processing unit 220 transports the cartridge 83C filled with the paint to the standby holding unit 230.

In the coating system 1 and the inkjet coating machine 10*c* having the above structure, the paint storage unit (cartridge 83C) storing the paint sprayed from the nozzle 54 is provided at the robot arm (second rotating arm 25). Besides, the arm-side circulation path 80C enabling the flow of the paint is provided at robot arm (second rotating arm 25). The arm-side circulation path 80C is also provided with an arm-side supply path (supply path 81C) that supplies the paint from the paint storage unit (cartridge 83C) to the head-side circulation path 70C, and an arm-side return path (return path 82C) that causes the paint not sprayed from the nozzle 54 to return from the head-side circulation path 70C and further supplies such paint to the arm-side circulation path 80C again.

Accordingly, the weight of the nozzle head unit 50 is reduced when the paint storage unit (cartridge 83C) is provided at the side of the robot arm (second rotating arm 25). In such case, the moment acting on the nozzle head unit 50 decreases and the motion performance is enhanced. Further, since the moment acting on a specific component, such as chuck 30, is reduced, it is unnecessary to provide a structure with high rigidity to correspond to a large moment. This is advantageous in terms of costs. With the reduced weight of the nozzle head unit 50, a small-sized coating apparatus main body 20 (robot) may be used, which also cuts down the costs of the inkjet coating machine 10.

Moreover, the arm-side circulation path 80C is provided at the side of the robot arm (second rotating arm 25), so as to form a circulation path for the paint between the arm-side circulation path 80C and the head-side circulation path 70C. Similar to the head-side circulation path 70 of the first implementation and the head-side circulation path 70B of the second implementation described above, the precipitation of the components of the paint can be avoided by causing the paint to circulate. Further, the clogging in the components of the nozzle 54 caused by the precipitation also can be prevented.

In the inkjet coating machine 10C of the third implementation, the paint storage unit is a cartridge 83C for storing the paint. Besides, the robot arm (second rotating arm 25) is provided with a cartridge mounting unit 500C, to/from which the cartridge 83C may be attached or detached freely.

Accordingly, the change of the type of paint, e.g., color change, can be implemented only by replacing the cartridge 83C with respect to the nozzle head unit 50C. In such case, it is unnecessary to prepare the nozzle head unit 50C in accordance with each coating color, which reduces the number of the nozzle head unit 50C. Besides, the cartridge mounting unit 500C is provided at the robot arm (second rotating arm 25) away from the nozzle head unit 50. In such structure, the attachment and detachment actuations of the nozzle head unit 50C with respect to the chuck 30 and the attachment and detachment actuations of the cartridge mounting unit 500C with respect to the cartridge 83C can be performed independently. Further, the above actuations also may be carried out simultaneously on the respective component, which shortens the time required for attachment and detachment.

[Fourth Implementation]

a. (4-1 Regarding the Structure of the Inkjet Coating Machine in Accordance with the Fourth Implementation)

b. Next, the overall structure of the inkjet coating machine in accordance with the fourth implementation of the present invention is explained below. Besides, throughout the fourth implementation, the same components as those in the above first, second and third implementations are indicated with the same reference signs and the related description is omitted. However, a letter "D" is added to the reference signs used in the fourth implementation to distinguish from the first, second and third implementations.

Figure 17:
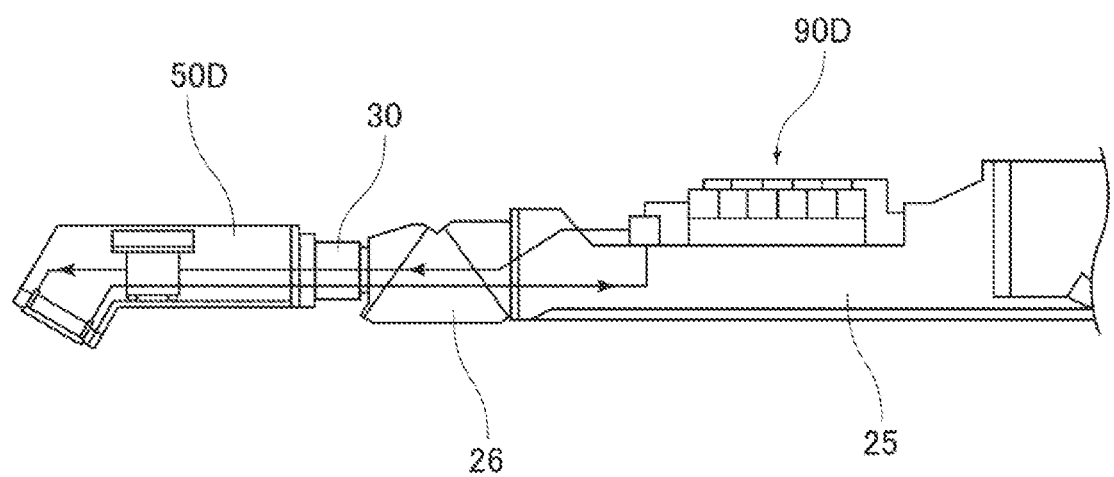
FIG. 17 illustrates a lateral view of a structure of the inkjet coating machine in accordance with the fourth implementation of the present invention starting from the second rotating arm to the nozzle head unit.

In the inkjet coating machine 10D in accordance with the fourth implementation, different types of paints are sprayed using a color change valve, for example, as in color changing. Details of the structure are explained below with reference to FIGS. 17 and 18. FIG. 17 illustrates a lateral view of a structure of the inkjet coating machine 10D in accordance with the fourth implementation of the present invention starting from the second rotating arm 25 to the nozzle head unit 50D. Besides, FIG. 18 is a schematic diagram demonstrating the structure of the head-side circulation path 70D, the arm-side circulation path 80D and the color changing valve 90D.

Figure 18:
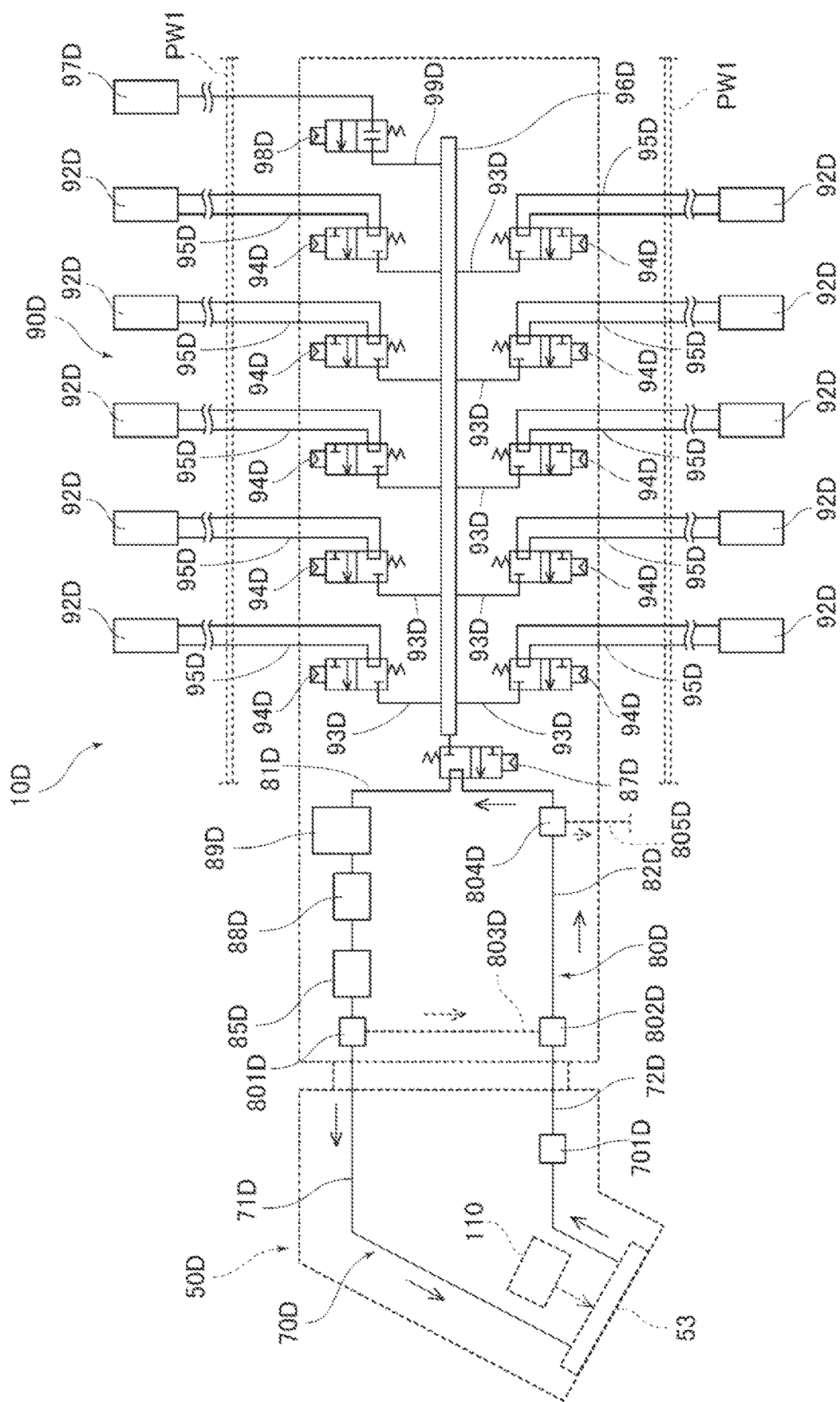
FIG. 18 is a schematic diagram illustrating the structure of the head-side circulation path, the arm-side circulation path and the color changing valve in the inkjet coating machine shown by FIG. 17.

As shown in FIGS. 17 and 18, the head-side circulation path 70D is provided with a supply path 71D identical to the above supply path 71C and a return path 72D the same as the above return path 72C. Although a seal valve 701D identical to the seal valve 701C is preferably provided at the return path 72D, a structure without the seal valve 701D may also be adopted.

Further, the arm-side circulation path 80C is provided at the second rotating arm 25, where the arm-side circulation path 80C includes a supply path 81C that is identical to the above supply path 81C and also connected to the above supply path 71D, and a return path 82D that is identical to the above return path 82C and also connected to the above return path 72D. The supply path 81D and the return path 82D are linked to a three-way valve 87D identical to the above mentioned three-way valve 77B.

An arm-side circulation path 80D identical to the above arm circulation path 80C is provided at the second rotating arm 25, where the arm-side circulation path 80D includes a supply path 81D connected to the above supply path 71D, and a return path 82D connected to the above return path 72D. The supply path 81D and the return path 82D are linked to a three-way valve 87D identical to the above mentioned three-way valve 87C.

A fixed-volume supply apparatus 85D, same as the above fixed-volume supply apparatus 85C, is provided at the supply path 81D. In addition, the supply path 81D is also provided with a paint regulator 88D, identical to the above paint regulator 88C, and a sub-tank 89D same as the sub-tank 89C. Therefore, even when the storage amount of the paint in the sub-tank 89D changes, the circulation of the paint in the arm-side circulation path 80D and the head-side circulation path 70D will not be affected. Hence, the circulating paint can be well sprayed from the nozzle head 53.

In addition, a structure in which at least one of the fixed-volume supply apparatus 85D, the paint regulator 88D and the sub-tank 89D is provided at the supply path 71D of the head-side circulation path 70D may also be adopted. The paint regulator 88D corresponds to a pressure adjustment unit.

A switching valve 801D identical to the above switching valve 801C is provided at the supply path 81D, and is connected to a bypass passage 803D same as the above bypass passage 803C. Besides, the bypass passage 803D is linked to a switching valve 802D identical to the above switching valve 802C. Similarly, a switching valve 804D identical to the above switching valve 804C is also provided on the return path 82D, and is connected to a discharge path 805D identical to the above discharge path 805C.

The three-way valve 87D is connected to a common flow path 96D of the color changing valve 90D. Here, the color changing valve 90D selectively supplies the chosen ink to the supply nozzle unit 50D. According to FIG. 18, the color changing valve 90D includes a paint supply source 92D, a connection flow path 93D, a switching valve 94D, a storage unit-side circulation path 95D, a common flow path 96D, a cleaning liquid storage unit 97D, a switching valve 98D and a cleaning liquid supply path 99D.

Of these, the paint supply source 92D is provided at a position where the painting is performed, i.e., a position separated from a painting chamber. Specifically, the inkjet coating machine 10D is provided inside a space surrounded by a painting chamber wall PW1 while the paint supply source 92D is provided outside the space surrounded by a painting chamber wall PW1. The paint supply source 92D is set in accordance with the type of paint. For example, in case there are six types of paints, six paint supply sources 92D should be provided. However, if one of the paints is heavily used, the number of paint supply sources 92D corresponding to this paint will increase.

The connection flow path 93D is connected to the common flow path 96D at one end and to the switching valve 94D at the other end. The switching valve 94D is identical to the above three-way valve 87D and is also linked to the storage unit-side circulation path 95D. When the coating is performed with paint (when the paint is sprayed from the nozzle head 53), the switching valve 94D switches its operation such that the paint flows from the storage unit-side circulation path 95D to the connection flow path 93D. When no paint is sprayed from the nozzle head 53, the valve is switched such that the paint circulates inside the storage unit-side circulation path 95D. In such way, the precipitation of the components in the paint can be avoided. Further, depending on the type of the paint, the viscosity of the paint sometimes may also reduce when the paint flows.

The common flow path 96D is connected to each connection flow path 93D and is also linked to the three-way valve 87D at one end. In addition, the common flow path 96D is also connected to a cleaning liquid supply path 99D to be described later.

The cleaning liquid storage unit 97D stores the cleaning liquid in case of the change in the type of paint. Besides, the switching valve 98D is provided in the middle of the cleaning liquid supply path 99D. Instead of being three-way, the switching valve 98D is a two-way valve that controls ON and OFF. The cleaning liquid supply path 99D also connects the cleaning liquid storage unit 97D with the common flow path 96D. By turning on the switching valve 98D before changing the paint for use, such as color change, the cleaning liquid stored in the cleaning liquid storage unit 97D flows towards the cleaning liquid supply path 99D. In such way, the common flow path 96D, the arm-side circulation path 80D and the head-side circulation path 70D are cleaned, so is the paint that has been used.

Additionally, the cleaning liquid storage unit 97D, the switching valve 98D and the cleaning liquid supply path 99D correspond to the arm-side cleaning unit.

(4-2 Regarding Acts of the Coating System)

a. The coating using the inkjet coating machine 10D according to the fourth implementation can be performed in the same manner as the inkjet coating machine 10 according to the first implementation described above.

When the coating of the vehicle is completed, the nozzle head unit 50D is detached from the chuck 30 as described in the first implementation in case of change of paint type, e.g., change in color. Following the detachment, a new nozzle head unit 50D is mounted to the chuck 30 via the processing unit 220, and the coating of a new vehicle is then performed using the new nozzle head unit 50D.

In the case where the nozzle head unit 50D is detached, the cleaning control unit 120 turns on the switching valve 98D, causing the cleaning liquid to flow from the cleaning liquid storage unit 97D to the common flow path 96D. Then, the switching valves 801D and 802D switch their actuations such that the cleaning liquid flows to the bypass passage 803D. When the cleaning is completed, the switching valve 804D is switched to discharge the waste liquid from the discharge path 805D. Accordingly, the cleaning of the arm-side circulation path 80D is performed when the nozzle head unit 50D is detached. Further, the head-side circulation path 70D and the arm-side circulation path 80D may also be cleaned while the nozzle head unit 50D is mounted on the chuck 30.

The nozzle head unit 50D detached from the chuck 30 is transported by the processing unit 220 to the cleaning mechanism 210, in which the surface of the nozzle head 53 and the interior of the nozzle head unit 50D (such as head-side circulation path 70 etc.) are cleaned. Afterwards, the nozzle head unit 50D is transported to the standby holding unit 230 by the processing unit 220 when the cleaning is completed.

In the coating system 1 and the inkjet coating machine 10D having the above structure, a paint storage unit 92D storing the paint of each color and a color changing valve 90D that changes color by supplying the chosen paint with respect to the nozzle head 53 are provided at the robot arm (second rotating arm 25). Besides, the robot arm (second rotating arm 25) is also provided with the arm-side circulation path 80D that enables the flow of the paint. The arm-side circulation path 80D further includes an arm-side supply path (supply path 81D) that supplies the paint from the color changing valve 90D to the head-side circulation path 70D, and an arm-side return path (return path 82D) that causes the paint not sprayed from the nozzle 54 to return from the head-side circulation path 70D and further supplies such paint to the arm-side circulation path 80D again. In addition, a pressure adjustment unit (paint regulator 88D) which regulates the pressure of the paint flowing from the color changing valve 90D via the arm-side supply path (supply path 81D) to the head-side circulation path (supply path 71D), and a main body control unit (main body control unit 100) controlling the operation of the color changing valve 90D and the pressure adjustment unit (paint regulator 88D) are provided at the robot arm (second rotating arm 25) or the nozzle head unit 50D. Based on the control over the actuations of the color changing valve 90D and the pressure adjustment unit (paint regulator 88D) by the main body control unit (main body control unit 100), the paint circulates between the head-side circulation path 70D and the color changing valve 90D via the arm-side supply path (supply path 81D) and the arm-side return path (return path 82D).

Besides, in the inkjet coating machine 10D provided with the color changing valve 90D, the paint also may circulate within the head-side circulation path 70D and the arm-side circulation path 80D, which prevents the components in the paint from precipitating.

Moreover, in the inkjet coating machine 10D of the fourth implementation, the color changing valve 90D is provided with the arm-side cleaning unit (including cleaning liquid storage unit 97D, switching valve 98D and cleaning liquid supply path 99D), which cleans the paint within the head-side circulation path 70D, the arm-side supply path (supply path 81D) and the arm-side return path (return path 82D), and is controlled by the main body control unit (main body control unit 100) to operate. When a new different type of paint from the chosen types of paints is selected by the main body control unit (main body control unit 100) using the color changing valve 90D, the arm-side cleaning unit (including cleaning liquid storage unit 97D, switching valve 98D and cleaning liquid supply path 99D) is controlled by the main body control unit (main body control unit 100) to operate.

As such, the common flow path 96D, the arm-side circulation path 80D and the head-side circulation path 70D are cleaned using the arm-side cleaning unit (including cleaning liquid storage unit 97D, switching valve 98D and cleaning liquid supply path 99D). Besides, the recently used paint is also cleaned, which ensures the quality of the coating using a new paint.

[Regarding Variants]

a. The first to fourth implementations of the present invention have been described above. In addition to that, the present invention also has multiple variants. Here, one of the variants is to be explained below.

The above implementations also may include a unit for cleaning the surface of the nozzle spraying face 52 (i.e., cleaning unit for nozzle spraying face). The above cleaning unit for nozzle spraying face, for example, may be a wiping unit that slides relative to the nozzle spraying face 52. The wiping unit includes a wiping component made of a flexible material, e.g., rubber, to wipe the paint attached on the nozzle spraying face 52. Besides, the cleaning unit for nozzle spraying face is not limited to the wiping unit. For example, the nozzle spraying face 52 may be cleaned by a method (wiping method) in which a porous member that absorbs paint, such as cloth or sponge, is pressed against the nozzle spraying face 52 to wipe.

In the above second implementation, the cartridge 73B is removed from the nozzle head unit 50B after the nozzle head unit 50B is detached from the chuck 30. However, when the paint within the cartridge 73B runs out and the same type of paint continues to be used for coating, only the cartridge 73B is replaced with a new one without detaching and cleaning the nozzle head unit 50B. In such case, the paint is preferably sprayed at other positions (so-called idling) until the paint is regularly sprayed from the nozzle 54.

Further, when only the cartridge 73B is replaced without substituting the nozzle head unit 50B with a new one as described above, if, for example, several cartridges 73B are continuously used, dirt toward the nozzle spraying face 52 and foreign matter inside the nozzle 54 are gradually accumulated. Therefore, the nozzle head unit 50B may be replaced when a predetermined number of cartridges 73B are used.

In the above third implementation, a structure in which the second rotating arm 25 is provided with the cartridge mounting unit 500C fitted with the cartridge 83C is described. However, the first rotating arm 24 or other positions may also be provided with the cartridge mounting unit on which the cartridge is detachably mounted.

Further, as disclosed in the above fourth implementation, the color changing valve 90D is provided at the second rotating arm 25. However, the color changing valve, for example, may also be provided at the first rotating arm 24 or other positions.

DESCRIPTION OF REFERENCE SIGNS

1 . . . coating system; 10, 10B, 10C, 10D . . . inkjet coating machine; 20 . . . coating apparatus main body; 21 . . . base table; 22 . . . leg; 22a . . . pivot shaft (corresponding to a portion of robot arm); 22a1 . . . housing; 23 . . . pivot arm (corresponding to a portion of robot arm); 23a . . . housing; 24 . . . first rotating arm (corresponding to a portion of robot arm); 25 . . . second rotating arm (corresponding to a portion of robot arm); 25a . . . housing; 26 . . . wrist (corresponding to a portion of robot arm); 30 . . . chuck; 31 . . . arm-side snapfit; 32 . . . snapfit main body; 33 . . . locating pin; 34 . . . piston insertion member; 35 . . . cam piston body; 35a . . . piston member; 35b . . . working pin; 35c . . . cam pressing part; 36 . . . support protrusion; 37 . . . locking cam; 37a . . . shaft; 37b . . . interference part; 41 . . . head-side snapfit; 42 . . . snapfit main body; 43 . . . locating hole; 44 . . . cam hole; 45 . . . snap-fit pin; 50, 50B, 50C, 50D . . . nozzle head unit; 51 . . . nozzle head; 52 . . . return path; 53 . . . nozzle head; 54 . . . nozzle; 55 . . . nozzle column; 60 . . . column-wise discharge path; 61 . . . discharge-side main flow path; 62 . . . piezoelectric substrate; 63a, 63b . . . piezoelectric ceramic layer; 64 . . . common electrode; 65 . . . single electrode; 70, 70B, 70C, 70D . . . head-side circulation path; 71, 71B, 71C, 71D . . . supply path; 72, 72B, 72C, 72D . . . return path; 73 . . . paint supply tank (corresponding to paint storage unit); 73a . . . cylinder; 73b . . . piston; 74 . . . supply line; 75, 75B, 85C, 85D . . . fixed-volume supply apparatus; 76B, 86C . . . connection flow path; 77B, 87C, 87D . . . three-way valve; 78B, 88C, 88D . . . paint regulator; 79B, 89C, 89D . . . sub-tank; 80C, 80D . . . arm-side circulation path; 81C, 81D . . . supply path (corresponding to arm-side supply path); 82C, 82D . . . return path (corresponding to arm-side return path); 83C . . . cartridge; 90D . . . color changing valve; 92D . . . paint supply source; 93D . . . connection flow path; 94D . . . switching valve; 95D . . . storage unit-side circulation path; 96D . . . common flow path; 97D . . . cleaning liquid storage unit; 98D . . . switching valve; 99D . . . cleaning liquid supply path; 100 . . . main body control unit (corresponding to main body control unit); 110 . . . nozzle control unit (corresponding to nozzle control unit); 120 . . . cleaning control unit; 130 . . . overall control unit; 200 . . . work station; 201 . . . frame; 202 . . . top panel; 210 . . . cleaning unit; 220 . . . processing unit (corresponding to head replacement unit); 230 . . . standby holding unit (corresponding to head standby holding unit and cartridge standby holding unit); 500B, 500C . . . cartridge mounting unit; 701, 701B, 701C, 701D . . . sealing valve; 801C, 802C, 804C . . . switching valve; 803C . . . bypass passage; 805C . . . discharge path

We claim:
1. A coating machine, which performs coating by spraying paint from a nozzle, comprising:
   a robot arm having a chuck at a front end;
   a nozzle head unit detachably mounted on the chuck and including: a nozzle head having a nozzle configured to spray the paint, a nozzle control unit configured to control driving of the nozzle, and a head-side circulation path configured to enable the paint to circulate within the nozzle head, wherein the nozzle head, the nozzle control unit and the head-side circulation path are integrally configured and detachably mounted with respect to the chuck, and wherein the head-side circulation path is completely contained within the nozzle head unit;
   a standby holding unit that holds at least one second nozzle head unit in a standby state; and
   a head replacement unit that replaces the nozzle head unit mounted on the chuck with the at least one second nozzle head unit held by the standby holding unit.

2. The coating machine of claim 1, wherein:
   the nozzle head unit is provided with a paint storage unit storing the paint sprayed from the nozzle, and wherein the paint storage unit is connected to the head-side circulation path, in a state in which the paint is able to be supplied.

3. The coating machine of claim 2, wherein:
   the paint storage unit is a paint supply tank integrated with the nozzle head unit, and
   the head-side circulation path is configured to enable the paint to circulate between the head-side circulation path and the paint supply tank.

4. The coating machine of claim 3, wherein:
   the paint from the nozzle head returns to the paint supply tank by connecting the paint supply tank to the head-side circulation path at one end;
   a cylinder storing the paint and a piston sliding within the cylinder are provided within the paint supply tank;
   an extruding apparatus is provided for pressing the piston in the cylinder;
   a supply volume control unit for controlling actuations of the extruding apparatus is provided;
   the supply volume control unit controls actuations of the extruding apparatus that extrudes the piston based on supply volume of the paint fed to the nozzle head and return volume of the paint returning from the nozzle head.

5. The coating machine of claim 2, wherein:
   the paint storage unit is a cartridge storing the paint, and
   the nozzle head is provided with a cartridge mounting unit on which the cartridge is detachably mounted.

6. The coating machine of claim 5, wherein:
   the standby holding unit holds the cartridge in standby;
   a cartridge replacement unit is configured to replace the cartridge mounted on the cartridge mounting unit with the cartridge held by the cartridge standby holding unit.

7. The coating machine of claim 2, wherein:
   a paint storage unit that stores the paint sprayed from the nozzle is provided at the robot arm, and
   an arm-side circulation path enabling flow of the paint is provided at the robot arm,
   the arm-side circulation path is provided with: an arm-side supply path that feeds the paint supplied from the paint storage unit towards the head-side circulation path; and an arm-side return path that causes the paint not sprayed from the nozzle to return from the head-side circulation path and supplies the paint to the arm-side supply path again.

8. The coating machine of claim 7, wherein:
the paint storage unit is a cartridge that stores the paint, and
the robot arm is provided with a cartridge mounting unit on which the cartridge is detachably mounted.

9. A coating machine, which performs coating by spraying paint from a nozzle, comprising:
a robot arm having a chuck at a front end;
a nozzle head unit detachably mounted on the chuck and including: a nozzle head having a nozzle configured to spray the paint, a nozzle control unit configured to control driving of the nozzle, and a head-side circulation path configured to enable the paint to circulate within the nozzle head, wherein the nozzle head, the nozzle control unit and the head-side circulation path are integrally configured and detachably mounted with respect to the chuck, and wherein the head-side circulation path is contained within the nozzle head unit;
a standby holding unit that holds at least one second nozzle head unit in a standby state; and
a head replacement unit that replaces the nozzle head unit mounted on the chuck with the at least one second nozzle head unit held by the standby holding unit,
the robot arm is provided with a color changing valve, the color changing valve having a paint storage unit that stores paint of each color and enabling color changing so that a chosen paint can be supplied to the nozzle head; and
the robot arm is provided with an arm-side circulation path that enables flow of the paint;
the arm-side circulation path is provided with an arm-side supply path and an arm-side return path, the arm-side supply path supplying the paint from the color changing valve towards the head-side circulation path, and the arm-side return path causing the paint not sprayed from the nozzle to return from the head-side circulation path and supplying the paint towards the arm-side supply path again;
the robot arm or the nozzle head unit is provided with a pressure adjustment unit and a main body control unit, the pressure adjustment unit regulating pressures of the paint flowing from the color changing valve via the arm-side supply path to the head-side circulation path, and the main body control unit controlling actuations of the color changing valve and the pressure adjustment unit;
based on actuation controlling of the color changing valve and the pressure adjustment unit by the main body control unit, the paint circulates between the head-side circulation path and the color changing valve via the arm-side supply path and the arm-side return path.

10. The coating machine of claim 9, wherein:
the color changing valve is provided with an arm-side cleaning unit, which cleans the paint within the head-side circulation path, the arm-side supply path and the arm-side return path, and is actuation controlled by the main body control unit;
when a different type of the paint from currently chosen types of paints is newly reselected by the main body control unit using the color changing valve, the arm-side cleaning unit is caused to actuate based on controlling by the main body.

11. A coating machine, which performs coating by spraying paint from a nozzle, comprising:
a robot arm having a chuck at a front end;
a nozzle head unit detachably mounted on the chuck and including: a nozzle head having a nozzle configured to spray the paint, a nozzle control unit configured to control driving of the nozzle, and a head-side circulation path configured to enable the paint to circulate within the nozzle head, wherein the nozzle head, the nozzle control unit and the head-side circulation path are integrally configured and detachably mounted with respect to the chuck, wherein the nozzle head unit is provided with a paint storage unit storing the paint sprayed from the nozzle, and wherein the paint storage unit is connected to the head-side circulation path, in a state in which the paint is able to be supplied;
a standby holding unit that holds at least one second nozzle head unit in a standby state; and
a head replacement unit that replaces the nozzle head unit mounted on the chuck with the at least one second nozzle head unit held by the standby holding unit,
wherein the paint storage unit that stores the paint sprayed from the nozzle is provided at the robot arm,
wherein an arm-side circulation path enabling flow of the paint is provided at the robot arm, and
wherein the arm-side circulation path is provided with: an arm-side supply path that feeds the paint supplied from the paint storage unit towards the head-side circulation path; and an arm-side return path that causes the paint not sprayed from the nozzle to return from the head-side circulation path and supplies the paint to the arm-side supply path again.

* * * * *